(12) United States Patent
Sloan et al.

(10) Patent No.: US 7,921,048 B2
(45) Date of Patent: Apr. 5, 2011

(54) FINANCIAL PLANNING AND COUNSELING SYSTEM PROJECTING USER CASH FLOW

(75) Inventors: Ronald E. Sloan, Toronto (CA);
Stephen B. Slutsky, Toronto (CA)

(73) Assignee: Accenture Global Services GmbH, Schaffhausen (CH)

( * ) Notice: Subject to any disclaimer, the term of this patent is extended or adjusted under 35 U.S.C. 154(b) by 1577 days.

(21) Appl. No.: 09/929,610

(22) Filed: Aug. 13, 2001

(65) Prior Publication Data
US 2002/0095363 A1 Jul. 18, 2002

Related U.S. Application Data

(63) Continuation of application No. 09/705,288, filed on Nov. 1, 2000, now abandoned, and a continuation-in-part of application No. 09/580,273, filed on May 25, 2000, now abandoned, and a continuation-in-part of application No. 09/431,668, filed on Nov. 1, 1999, now abandoned.

(51) Int. Cl.
*G06Q 40/00* (2006.01)
(52) U.S. Cl. .................................................. 705/36 R
(58) Field of Classification Search .................. 705/35, 705/36
See application file for complete search history.

(56) References Cited

U.S. PATENT DOCUMENTS

| | | | |
|---|---|---|---|
| 4,455,609 A | 6/1984 | Inamura et al. | |
| 4,597,046 A | 6/1986 | Musmanno et al. | |
| 4,822,647 A | 4/1989 | Nozaki et al. | |
| 4,896,291 A | 1/1990 | Gest et al. | |
| 4,953,085 A | 8/1990 | Atkins | |
| 5,077,665 A | 12/1991 | Silverman et al. | |
| 5,126,936 A | 6/1992 | Champion et al. | |

(Continued)

FOREIGN PATENT DOCUMENTS
GB 2 192 567 A 1/1998
(Continued)

OTHER PUBLICATIONS

Press Release, "ZY.COM: ZY.com makes creating and publishing websites simple and FREE for everyone", M2 Presswire; Coventry; Mar. 26, 1998, pp. 2, extracted on Internet on Oct. 29, 2001 from Proquest database [http://proquest.umi.com/pqdweb].

(Continued)

*Primary Examiner* — Jason M Borlinghaus
(74) *Attorney, Agent, or Firm* — Finnegan, Henderson, Farabow, Garrett & Dunner LLP

(57) ABSTRACT

A system, method and article of manufacture are provided for generating an online, web-enabled financial model accessible over the Internet. A service level agreement that defines a level of financial management desired by a user is provided. A user is prompted to input financial information relative to the user. The financial information is stored in a database. A prospective cash flow of the user is aggregated over a predetermined amount of time based on the service level agreement and the financial information. The prospective cash flow is then output to the user. As an option, the user may be allowed to re-input the financial information if the prospective cash flow is deemed unacceptable by the user. A risk analysis may be executed if the prospective cash flow is deemed acceptable by the user. Further, advice based on the financial information may be output if the prospective cash flow is deemed acceptable to the user.

21 Claims, 21 Drawing Sheets

U.S. PATENT DOCUMENTS

| | | |
|---|---|---|
| 5,132,899 A | 7/1992 | Fox |
| 5,136,501 A | 8/1992 | Silverman et al. |
| 5,161,103 A | 11/1992 | Kosaka et al. |
| 5,185,696 A | 2/1993 | Yoshino et al. |
| 5,193,056 A | 3/1993 | Boes |
| 5,214,579 A | 5/1993 | Wolfberg et al. |
| 5,222,019 A | 6/1993 | Yoshino et al. |
| 5,481,476 A | 1/1996 | Windig |
| 5,615,109 A | 3/1997 | Eder |
| 5,729,700 A | 3/1998 | Melnikoff |
| 5,745,885 A | 4/1998 | Mottola et al. |
| 5,761,442 A | 6/1998 | Barr et al. |
| 5,774,663 A | 6/1998 | Randle et al. |
| 5,774,878 A | 6/1998 | Marshall |
| 5,774,880 A | 6/1998 | Ginsberg |
| 5,774,883 A | 6/1998 | Andersen et al. |
| 5,784,696 A | 7/1998 | Melnikoff |
| 5,799,287 A | 8/1998 | Dembo |
| 5,806,048 A | 9/1998 | Kiron et al. |
| 5,806,049 A | 9/1998 | Petruzzi |
| 5,809,484 A | 9/1998 | Mottola et al. |
| 5,811,055 A | 9/1998 | Geiger |
| 5,812,988 A | 9/1998 | Sandretto |
| 5,819,237 A | 10/1998 | Garman |
| 5,819,263 A | 10/1998 | Bromley et al. |
| 5,826,250 A | 10/1998 | Trefler |
| 5,852,811 A | 12/1998 | Atkins |
| 5,857,176 A | 1/1999 | Ginsberg |
| 5,864,828 A | 1/1999 | Atkins |
| 5,870,550 A | 2/1999 | Wesinger, Jr. |
| 5,873,071 A | 2/1999 | Ferstenberg et al. |
| 5,875,437 A * | 2/1999 | Atkins ............................ 705/40 |
| 5,884,287 A | 3/1999 | Edesess |
| 5,893,079 A | 4/1999 | Cwenar |
| 5,903,879 A | 5/1999 | Mitchell |
| 5,911,135 A | 6/1999 | Atkins |
| 5,911,136 A | 6/1999 | Atkins |
| 5,913,202 A | 6/1999 | Motoyama |
| 5,918,217 A | 6/1999 | Maggioncalda et al. |
| 5,920,848 A | 7/1999 | Schutzer et al. |
| 5,930,762 A | 7/1999 | Masch |
| 5,930,774 A | 7/1999 | Chennault |
| 5,940,812 A | 8/1999 | Tengel et al. |
| 5,950,176 A | 9/1999 | Keiser et al. |
| 5,963,625 A | 10/1999 | Kawecki |
| 5,963,925 A | 10/1999 | Kolling et al. |
| 5,970,478 A | 10/1999 | Walker et al. |
| 5,978,778 A | 11/1999 | O'Shaughnessy |
| 5,987,433 A | 11/1999 | Crapo |
| 5,987,434 A | 11/1999 | Libman |
| 5,987,436 A | 11/1999 | Halbrook |
| 5,999,918 A | 12/1999 | Williams et al. |
| 6,003,018 A | 12/1999 | Michaud et al. |
| 6,006,201 A | 12/1999 | Berent et al. |
| 6,012,042 A | 1/2000 | Black et al. |
| 6,012,043 A | 1/2000 | Albright et al. |
| 6,012,044 A | 1/2000 | Maggioncalda et al. |
| 6,018,722 A | 1/2000 | Ray et al. |
| 6,018,768 A | 1/2000 | Ullman et al. |
| 6,021,397 A | 2/2000 | Jones et al. |
| 6,026,382 A | 2/2000 | Kalthoff |
| 6,029,153 A | 2/2000 | Bauchner et al. |
| 6,055,514 A | 4/2000 | Wren |
| 6,055,517 A | 4/2000 | Friend |
| 6,058,378 A | 5/2000 | Clark et al. |
| 6,064,984 A * | 5/2000 | Ferguson et al. ............ 705/36 R |
| 6,064,986 A | 5/2000 | Edelman |
| 6,069,628 A | 5/2000 | Farry |
| 6,078,904 A | 6/2000 | Rebane |
| 6,081,768 A | 6/2000 | Hu |
| 6,085,175 A | 7/2000 | Gugel et al. |
| 6,112,181 A | 8/2000 | Shear et al. |
| 6,119,103 A | 9/2000 | Basch et al. |
| 6,125,355 A | 9/2000 | Bekaert et al. |
| 6,151,582 A | 11/2000 | Huang et al. |
| 6,186,793 B1 | 2/2001 | Brubaker |
| 6,195,697 B1 | 2/2001 | Bowman-Amuah |
| 6,230,197 B1 | 5/2001 | Beck et al. |
| 6,233,566 B1 | 5/2001 | Levine et al. |
| 6,236,972 B1 | 5/2001 | Shkedy |
| 6,236,975 B1 | 5/2001 | Boe et al. |
| 6,253,192 B1 | 6/2001 | Corlett et al. |
| 6,256,773 B1 | 7/2001 | Bowman-Amuah |
| 6,272,528 B1 | 8/2001 | Cullen et al. |
| 6,275,807 B1 | 8/2001 | Schirripa |
| 6,275,814 B1 | 8/2001 | Giansante et al. |
| 6,282,520 B1 | 8/2001 | Schirripa |
| 6,292,787 B1 | 9/2001 | Scott et al. |
| 6,292,827 B1 | 9/2001 | Raz |
| 6,307,958 B1 | 10/2001 | Deaton et al. |
| 6,317,726 B1 | 11/2001 | O'Shaughnessy |
| 6,324,523 B1 | 11/2001 | Killeen, Jr. |
| 6,327,586 B1 | 12/2001 | Kisiel |
| 6,332,154 B2 | 12/2001 | Beck et al. |
| 6,336,102 B1 | 1/2002 | Luskin et al. |
| 6,349,290 B1 | 2/2002 | Horowitz et al. |
| 6,360,210 B1 | 3/2002 | Wallman |
| 6,370,355 B1 | 4/2002 | Ceretta et al. |
| 6,370,508 B2 | 4/2002 | Beck et al. |
| 6,375,466 B1 | 4/2002 | Juranovic |
| 6,388,688 B1 | 5/2002 | Schileru-Key |
| 6,393,409 B2 | 5/2002 | Young et al. |
| 6,393,412 B1 | 5/2002 | Deep |
| 6,405,179 B1 | 6/2002 | Rebane |
| 6,408,225 B1 | 6/2002 | Ortmeier et al. |
| 6,418,417 B1 | 7/2002 | Corby et al. |
| 6,430,542 B1 | 8/2002 | Moran |
| 6,470,325 B1 * | 10/2002 | Leemhuis .................. 705/36 R |
| 6,477,447 B1 | 11/2002 | Lin |
| 6,513,069 B1 | 1/2003 | Abato et al. |
| 6,539,419 B2 | 3/2003 | Beck et al. |
| 6,564,191 B1 | 5/2003 | Reddy |
| 6,567,796 B1 | 5/2003 | Yost et al. |
| 6,574,600 B1 | 6/2003 | Fishman et al. |
| 6,601,044 B1 | 7/2003 | Wallman |
| 6,606,606 B2 | 8/2003 | Starr |
| 6,615,240 B1 * | 9/2003 | Sullivan et al. ............... 709/205 |
| 7,231,608 B1 | 6/2007 | Fano et al. |
| 7,315,837 B2 | 1/2008 | Sloan et al. |
| 7,401,040 B2 | 7/2008 | Sloan et al. |
| 2001/0032207 A1 | 10/2001 | Hartley et al. |
| 2001/0039493 A1 | 11/2001 | Pustejovsky et al. |
| 2001/0044739 A1 | 11/2001 | Bensemana |
| 2002/0046074 A1 | 4/2002 | Barton |
| 2002/0087496 A1 | 7/2002 | Stirpe et al. |
| 2002/0091607 A1 | 7/2002 | Sloan et al. |
| 2002/0095363 A1 | 7/2002 | Sloan et al. |
| 2002/0099613 A1 | 7/2002 | Swart et al. |
| 2002/0111890 A1 | 8/2002 | Sloan et al. |
| 2002/0147671 A1 | 10/2002 | Sloan et al. |
| 2002/0161928 A1 | 10/2002 | Ndili |
| 2003/0144936 A1 | 7/2003 | Sloan et al. |

FOREIGN PATENT DOCUMENTS

| | | |
|---|---|---|
| JP | 408086190 A | 4/1996 |
| JP | 100-93729 | 9/1996 |
| JP | 410093729 A | 9/1996 |
| JP | 411110447 A | 4/1999 |
| JP | 2000163030 A | 6/2000 |
| JP | 2000355290 A | 12/2000 |
| JP | 2001-209721 | 8/2001 |
| WO | WO 98/14902 | 4/1998 |
| WO | WO 98/38558 | 9/1998 |
| WO | WO 01/22253 | 3/2001 |
| WO | WO0137187 | 5/2001 |

OTHER PUBLICATIONS

*Dayco* Statement Regarding Related Applications.
Glenn Kennedy et al., "Web to watch CAD companies online", from CADalyst, Sep. 1, 2000.
Rob Fanjogy, "New design software connects colleagues", from Professional Builder, Mar. 1, 1999.
Ouchi et al., "Handshake telephone system to communicate with voice and force", 1997, IEEE, pp. 466-471.
Sato et al., "Measuring system for grasping", 1996, IEEE, pp. 292-297.

Karlsson et al., "A glove equipped with finger flexion sensors as command generator used in fuzzy control system", 1998, IEEE, pp. 1330-1334.

"Personal financial software", The CPA Journal, New York, Sep. 1999, vol. 69, Iss.9; p. 40, 7 pgs, Proquest, describes numbers of software packages on the market for providing automated coaching for a financial modeling.

"Sams Teach Yourself the Internet in 24 Hours," by Ned Snell, Sams Publishing, published Jun. 17, 1999, http://proquest.safaribooksonline.com/JVXSL.asp (last accessed on Jul. 21, 2005).

Office Action Issued by EPO on Aug. 23, 2007 regarding summons to attend oral proceedings on Application No. 02765976.2-1238.

Office Action Issued on Oct. 2, 2007 by US PTO on U.S. Appl. No. 09/927,560.

Akers, Robert L., SCIFINANCE. (data processing in the securities industry), AI Magazine, Summer, 2001.

Kurt Chang, Solving pattern data exchange problems: standards development revived, From Bobbin, Oct. 1, 2000.

Cliff Currin, Financial Risk Management in Action. (petrochemicals industry), Chemical Week, Sep. 26, 2001.

Louis C. Gapenski, Debt-Maturity Structures Should Match Risk Preferences, (statistical data included), Healthcare Financial Management Dec. 1999.

Don N. Kleinmuntz, Measuring and managing risk improves strategic financial Planning, Healthcare Financial Management, Jun. 1999.

Dean Villegas, WHIP! Your AutoCAD drawings, From CADalyst, Feb. 1, 1998.

Office Action issued Oct. 23, 2007 by EPO on European Application No. 02 802 758.9-2221.

Office Action issued on Oct. 31, 2007 by US PTO on U.S. Appl. No. 09/930,786.

Office Action issued on Nov. 30, 2007 by US PTO on U.S. Appl. No. 09/704,838.

Office Action issued on Feb. 6, 2008 by US PTO on U.S. Appl. No. 09/976,443.

Office Action issued on Feb. 8, 2008 by US PTO on U.S. Appl. No. 09/927,560.

Office Action issued Jan. 31, 2008 by EPO on Application No. 00959 864.0.

Office Action issued on Feb. 15, 2008 by US PTO on U.S. Appl. No. 09/930,786.

Office Action issued on Apr. 3, 2008 by US PTO on U.S. Appl. No. 09/927,560.

Office Action issued on Jul. 24, 2008 by US PTO on U.S. Appl. No. 09/976,443.

Office Action issued on Jul. 25, 2008 by US PTO on U.S. Appl. No. 09/930,786.

"GE Center for Financial Learning; Planning Tools, 'How Much Am I Spending?'" Internet Article, Online! 1999-2000. Retrieved from the Internet: www.financiallearning.com/ge/calculator.jsp?oid=9705&BV_SessionID=@@@@1126282150.1003 930066@@@@&BV_EngineID=cadccfkmghkgbedcgceckh.0> on Oct. 24, 2001; 3 pgs.

Bacchus, F. et al. "Planning for Temporally Extended Goals" 13th International Conference on AI, Portland, OR, 1996; *AAAI-96 Proceedings*, pp. 1215-1222.

Bellone, R. "Forecast Your Clients' Financial Future" *Accounting Technology*, vol. 12, No. 3, 1996. Retrieved from the Internet: http://proquest.umi.com on Jun. 19, 2002; 6 pgs.

Booker, E. "A Think-Tank Vision" Internetweek.com, Sep. 10, 1999. Retrieved from the Internet: www.internetwk.com; 3 pgs.

Campbell, T. "Get Plugged in: Service with a :-)" Sales and Marketing Management, vol. 151, Issue 3, Mar. 1999; pp. 62-68. Retrieved from the Internet: http://proquest.umi.com on Mar. 4, 2003.

Carey, T. "Putting the Brains in Your PC" Barrons, vol. 78, Issue 49, 1998. Retrieved from the Internet: http://proquest.umi.com on Jun. 18, 2002; 4 pgs.

Dayco Statement Regarding Related Applications filed in U.S. Appl. No. 09/520,580 on Nov. 26, 2003.

Deb, K. "Solving Goal Programming Problems Using Multi-Objective Genetic Algorithms" Proceedings of the Congress on Evolutionary Computing, Jul. 6-9, 1999; pp. 77-84.

Epstein, E. "Converging Future" InfoWorld News, Jan. 7, 2000. Retrieved from the Internet: http://sandbox.xerox.com; 8 pgs.

European Patent Application No. 00976918.3 (Publication No. EP 1228470), Communication pursuant to Article 96(2) EPC, with Annex to the communication; Date: Oct. 24, 2002.

European Patent Application No. 00991933.3 (Publication No. EP 1228473), Communication pursuant to Article 94(3) EPC, with Annex to the communication; Date: Feb. 16, 2009.

European Patent Application No. 01927371.3 (Publication No. EP 1269386), Communication pursuant to Article 96(2), with Annex to the communication; Date: Jun. 5, 2003.

European Patent Application No. 01927371.3 (Publication No. EP 1269386), Decision to refuse a European Patent Application, with Annex to the communication; Date: Mar. 17, 2005.

European Patent Application No. 01927371.3 (Publication No. EP 1269386), Minutes of the oral proceedings before the Examining Division; Date of Proceedings: Feb. 17, 2005, Date of Minutes: Mar. 17, 2005.

European Patent Application No. 01927371.3 (Publication No. EP 1269386), Summons to attend oral proceedings, with Annex to the communication; Date: Oct. 27, 2004.

European Patent Application No. 02759326.8 (Publication No. EP 1419468), Communication pursuant to Article 96(2) EPC, with Annex to the communication; Date: Sep. 19, 2005.

European Patent Application No. 02759326.8 (Publication No. EP 1419468), Minutes of the oral proceedings before the Examining Division, with Annex to the communication; Date of Proceedings: Nov. 4, 2009, Date of Minutes: Dec. 10, 2009.

European Patent Application No. 02759326.8 (Publication No. EP 1419468), Summons to attend oral proceedings, with Annex to the communication; Date: Jan. 28, 2009.

European Patent Application No. 02765975.4 (Publication No. EP 1423772), Supplementary Search Report; Date of Mailing: Aug. 2, 2006.

European Patent Application No. 02765976.2 (Publication No. EP 1423813), Communication pursuant to Article 96(2) EPC, with Annex to the communication; Date: Feb. 10, 2005.

European Patent Application No. 02765976.2 (Publication No. EP 1423813), Communication regarding the declaration under Rule 45 EPC, with Annex to the communication; Date: Jul. 1, 2004.

European Patent Application No. 02765976.2 (Publication No. EP 1423813), Decision to refuse a European Patent application; Date: Jan. 21, 2008.

European Patent Application No. 02765976.2 (Publication No. EP 1423813), Minutes of the oral proceedings before the Examining Division, with Annexes to the communication; Date of Proceedings: Nov. 27, 2007; Date of Minutes: Jan. 21, 2008.

European Patent Application No. 02765976.2 (Publication No. EP 1423813), Result of consultation of Nov. 19, 2007 with Annex to the communication; Date: Nov. 23, 2007.

European Patent Application No. 02794694.6 (Publication No. EP 1423815), Communication pursuant to Article 96(2) EPC, with Annex to the communication; Date: Jul. 20, 2006.

European Patent Application No. 02794694.6 (Publication No. EP 1423815), Communication regarding the declaration under Rule 45 EPC, with Annex to the Communication; Date: Oct. 29, 2004.

European Patent Application No. 02802758.9 (Publication No. EP 1435033), Communication regarding the declaration under Rule 45 EPC, with Annex to the communication; Date: Mar. 27, 2006.

European Patent Application No. 02802758.9 (Publication No. EP 1435033), Minutes of the oral proceedings before the Examining Division, with Annexes to the communication; Date of Proceedings: Jun. 17, 2009, Date of Minutes: Jun. 30, 2009.

European Patent Application No. 02802758.9 (Publication No. EP 1435033), Summons to attend oral proceedings, with Annex to the communication; Date: Mar. 5, 2009.

European Patent Application No. EP 01927370.5 (Publication No. EP 1264245), Communication pursuant to Article 96(2) EPC, with Annex to the communication; Date: Aug. 6, 2007.

Fano, A.E. "A strategy-based theory of planning for goal-based scenario-learning environments" Dissertation Abstracts International, vol. 57, Issue 11-B, 1996. Retrieved from Dialog, File 35: Dissertation Abs Online, 1 pg.

Fano, A.E. "Shoppers Eye: Using Location-based filtering for a Shopping Agent in the Physical World" Proceedings of the 2nd International Conference on Autonomous Agents, May 9-13, 1998. Retrieved from Dialog, File 2: INSPEC, 2 pgs.

Fischer, D.E. et al. Security Analysis and Portfolio Management. Fifth Edition. Prentice-Hall, Inc., New Jersey, 1991; pp. 89-158.

International Patent Application No. PCT/US00/30389 (Publication No. WO 01/33467), Declaration of Non-Establishment of International Search Report Under PCT Article 17(2)(a); Date of Mailing: Sep. 18, 2001.

International Patent Application No. PCT/US00/30389 (Publication No. WO 01/33467), International Preliminary Examination Report; Date of Completion: Aug. 15, 2002.

International Patent Application No. PCT/US00/30423 (Publication No. WO 01/33402), Declaration of Non-Establishment of International Search Report Under PCT Article 17(2)(a); Date of Mailing: Nov. 5, 2001.

International Patent Application No. PCT/US00/30423 (Publication No. WO 01/33402), International Preliminary Examination Report; Date of Completion: Sep. 14, 2003.

International Patent Application No. PCT/US00/41850 (Publication No. WO 01/37187), Declaration of Non-Establishment of International Search Report Under PCT Article 17(2)(a); Date of Mailing: Feb. 5, 2002.

International Patent Application No. PCT/US00/41850 (Publication No. WO 01/37187), International Preliminary Examination Report; Date of Completion: Sep. 7, 2002.

International Patent Application No. PCT/US00/41852 (Publication No. WO 01/33474), Declaration of Non-Establishment of International Search Report Under PCT Article 17(2)(a); Date of Mailing: Sep. 25, 2001.

International Patent Application No. PCT/US00/41852 (Publication No. WO 01/33474), International Preliminary Examination Report; Date of Completion: Jul. 26, 2002.

International Patent Application No. PCT/US00/41855 (Publication No. WO 01/67334), Declaration of Non-Establishment of International Search Report Under PCT Article 17(2)(a); Date of Mailing: Aug. 23, 2001.

International Patent Application No. PCT/US00/41855 (Publication No. WO 01/67334), International Preliminary Examination Report; Date of Completion: Feb. 10, 2002.

International Patent Application No. PCT/US00/41872 (Publication No. WO 01/33476), Declaration of Non-Establishment of International Search Report Under PCT Article 17(2)(a); Date of Mailing: May 28, 2003.

International Patent Application No. PCT/US00/41872 (Publication No. WO 01/33476), International Preliminary Examination Report; Date of Completion: Apr. 8, 2005.

International Patent Application No. PCT/US01/40213 (Publication No. WO 01/65907), Declaration of Non-Establishment of International Search Report Under PCT Article 17(2)(a); Date of Mailing: Jun. 15, 2001.

International Patent Application No. PCT/US01/40213 (Publication No. WO 01/65907), International Preliminary Examination Report; Date of Completion: Oct. 16, 2003.

International Patent Application No. PCT/US01/40213 (Publication No. WO 01/65907), Written Opinion; Date of Mailing: Apr. 4, 2003.

International Patent Application No. PCT/US01/40214 (Publication No. WO 01/67340), International Preliminary Examination Report; Date of Completion: Jul. 28, 2002.

International Patent Application No. PCT/US01/40214 (Publication No. WO 01/67340), International Search Report; Date of Mailing: Nov. 9, 2001.

International Patent Application No. PCT/US02/25488 (Publication No. WO 03/17040), International Preliminary Examination Report; Date of Completion: May 19, 2004.

International Patent Application No. PCT/US02/25488 (Publication No. WO 03/17040), International Search Report; Date of Mailing: Jun. 23, 2003.

International Patent Application No. PCT/US02/25489 (Publication No. WO 03/14884), International Preliminary Examination Report; Date of Completion: Jul. 2, 2003.

International Patent Application No. PCT/US02/25489 (Publication No. WO 03/14884), International Search Report; Date of Mailing: Mar. 6, 2003.

International Patent Application No. PCT/US02/25491 (Publication No. WO 03/17041), International Preliminary Examination Report; Date of Completion: Jun. 26, 2003.

International Patent Application No. PCT/US02/25491 (Publication No. WO 03/17041), International Search Report; Date of Mailing: May 29, 2003.

International Patent Application No. PCT/US02/25492 (Publication No. WO 03/39227), International Preliminary Examination Report; Date of Completion: Nov. 2, 2003.

International Patent Application No. PCT/US02/25492 (Publication No. WO 03/39227), International Search Report; Date of Mailing: Aug. 18, 2003.

International Patent Application No. PCT/US02/25500 (Publication No. WO 03/17168), Declaration of Non-Establishment of International Search Report Under PCT Article 17(2)(a); Date of Mailing: Apr. 22, 2003.

International Patent Application No. PCT/US02/25500 (Publication No. WO 03/17168), International Preliminary Examination Report; Date of Completion: Jan. 12, 2004.

Intuit Press Release, "CNNfn.com and Intuit Announce Quicken. com on Fn, the Premier Personal Financial Resource on the Web" Dec. 2, 1997; 2 pgs.

Jaffe, L.A. "Quicken Financial Planner" Harvard Computer Review, vol. 14, No. 1, Apr. 1997.

Meahdra, M. "The ABC's of Netscape Composer" SYBEX, San Fransisco-Paris-Dusseldorf-Soest, 1997; p. 15, 66.

Mortenson, P. "Financial Planning by Computer" Best's Review (Life+/Health), vol. 85, No. 2, 1984; pp. 38, 40.

Nelson, S.L. Quicken 98 for Windows for Dummies. IDG Books Worldwide, Inc., 1998. Table of Contents, 15 pgs.

Office Action issued in U.S. Appl. No. 09/430,993; Date Mailed: Aug. 29, 2002.

Office Action issued in U.S. Appl. No. 09/431,389; Date Mailed: Nov. 7, 2001.

Office Action issued in U.S. Appl. No. 09/431,394; Date Mailed: Jul. 15, 2002.

Office Action issued in U.S. Appl. No. 09/431,417; Date Mailed: Jun. 15, 2001.

Office Action issued in U.S. Appl. No. 09/431,668; Date Mailed: May 24, 2002.

Office Action issued in U.S. Appl. No. 09/431,684, Restriction Requirement; Mail Date: Jul. 8, 2002.

Office Action issued in U.S. Appl. No. 09/431,684; Date Mailed: Sep. 9, 2002.

Office Action issued in U.S. Appl. No. 09/451,596, Restriction Requirement; Mail Date: Jun. 27, 2002.

Office Action issued in U.S. Appl. No. 09/451,667, Restriction Requirement; Mail Date: Jun. 27, 2002.

Office Action issued in U.S. Appl. No. 09/451,670; Date Mailed: Oct. 23, 2001.

Office Action issued in U.S. Appl. No. 09/451,675; Date Mailed: Aug. 2, 2002.

Office Action issued in U.S. Appl. No. 09/452,273, Restriction Requirement; Date Mailed: Jul. 23, 2002.

Office Action issued in U.S. Appl. No. 09/452,273; Date Mailed: Aug. 29, 2002.

Office Action issued in U.S. Appl. No. 09/452,276; Date Mailed: Jul. 18, 2002.

Office Action issued in U.S. Appl. No. 09/452,280; Date Mailed: Sep. 19, 2002.

Office Action issued in U.S. Appl. No. 09/520,564; Date Mailed: Apr. 14, 2003.

Office Action issued in U.S. Appl. No. 09/520,564; Date Mailed: Jul. 1, 2002.

Office Action issued in U.S. Appl. No. 09/520,580, Advisory Action; Date Mailed: Aug. 6, 2003.

Office Action issued in U.S. Appl. No. 09/520,580, Advisory Action; Date Mailed: Feb. 9, 2005.

Office Action issued in U.S. Appl. No. 09/520,580, Advisory Action; Date Mailed: Oct. 6, 2004.

Office Action issued in U.S. Appl. No. 09/520,580, Notice of Allowance; Date Mailed: Dec. 1, 2005.
Office Action issued in U.S. Appl. No. 09/520,580; Date Mailed: Dec. 4, 2003.
Office Action issued in U.S. Appl. No. 09/520,580; Date Mailed: Jul. 25, 2002.
Office Action issued in U.S. Appl. No. 09/520,580; Date Mailed: Jun. 16, 2004.
Office Action issued in U.S. Appl. No. 09/520,580; Date Mailed: Mar. 12, 2003.
Office Action issued in U.S. Appl. No. 09/520,600; Date Mailed: Sep. 26, 2002.
Office Action issued in U.S. Appl. No. 09/520,938; Date Mailed: Feb. 19, 2003.
Office Action issued in U.S. Appl. No. 09/520,940 - Decision on Appeal by the Board of Patent Appeals and Interferences; Decided: Apr. 23, 2007.
Office Action issued in U.S. Appl. No. 09/520,940 - Examiners Answer before the Board of Patent Appeals and Interferences; Date Mailed: Mar. 21, 2006.
Office Action issued in U.S. Appl. No. 09/520,940, Advisory Action; Date Mailed: Jul. 12, 2004.
Office Action issued in U.S. Appl. No. 09/520,940; Date Mailed: Apr. 8, 2005.
Office Action issued in U.S. Appl. No. 09/520,940; Date Mailed: Aug. 26, 2003.
Office Action issued in U.S. Appl. No. 09/520,940; Date Mailed: Feb. 25, 2003.
Office Action issued in U.S. Appl. No. 09/520,940; Date Mailed: Jan. 30, 2004.
Office Action issued in U.S. Appl. No. 09/520,940; Date Mailed: Jun. 25, 2002.
Office Action issued in U.S. Appl. No. 09/520,940; Date Mailed: Oct. 5, 2004.
Office Action issued in U.S. Appl. No. 09/520,943, Advisory Action; Date Mailed: Mar. 12, 2004.
Office Action issued in U.S. Appl. No. 09/520,943, Decision on Appeal Before the Board of Patent Appeals and Interferences, Appeal No. 2007-0868; Decided: Feb. 28, 2008.
Office Action issued in U.S. Appl. No. 09/520,943, Examiner Interview Summary; Date Mailed: Oct. 20, 2009.
Office Action issued in U.S. Appl. No. 09/520,943, Examiner Interview Summary; Date Mailed: Sep. 19, 2006.
Office Action issued in U.S. Appl. No. 09/520,943, Examiners Answer Before the Board of Patent Appeals and Interferences; Date Mailed: Nov. 7, 2005.
Office Action issued in U.S. Appl. No. 09/520,943, Examiners Answer Before the Board of Patent Appeals and Interferences; Date Mailed: Sep. 26, 2006.
Office Action issued in U.S. Appl. No. 09/520,943; Date Mailed: Jan. 13, 2005.
Office Action issued in U.S. Appl. No. 09/520,943; Date Mailed: Jan. 6, 2009.
Office Action issued in U.S. Appl. No. 09/520,943; Date Mailed: Jul. 14, 2008.
Office Action issued in U.S. Appl. No. 09/520,943; Date Mailed: Jul. 19, 2004.
Office Action issued in U.S. Appl. No. 09/520,943; Date Mailed: Jul. 8, 2009.
Office Action issued in U.S. Appl. No. 09/520,943; Date Mailed: Mar. 11, 2003.
Office Action issued in U.S. Appl. No. 09/520,943; Date Mailed: Nov. 18, 2003.
Office Action issued in U.S. Appl. No. 09/520,944; Date Mailed: Mar. 14, 2003.
Office Action issued in U.S. Appl. No. 09/521,470; Date Mailed: Apr. 23, 2003.
Office Action issued in U.S. Appl. No. 09/579,849; Date Mailed: Jul. 25, 2003.
Office Action issued in U.S. Appl. No. 09/579,852; Date Mailed: Mar. 25, 2003.
Office Action issued in U.S. Appl. No. 09/579,853; Date Mailed: Oct. 15, 2002.
Office Action issued in U.S. Appl. No. 09/579,854; Date Mailed: Dec. 18, 2002.
Office Action issued in U.S. Appl. No. 09/580,214; Date Mailed: Feb. 4, 2003.
Office Action issued in U.S. Appl. No. 09/580,273, Restriction Requirement; Mail Date: Sep. 8, 2003.
Office Action issued in U.S. Appl. No. 09/580,273; Date Mailed: Apr. 5, 2005.
Office Action issued in U.S. Appl. No. 09/580,276; Date Mailed: Dec. 18, 2002.
Office Action issued in U.S. Appl. No. 09/580,349; Date Mailed: Jul. 25, 2003.
Office Action issued in U.S. Appl. No. 09/580,350; Date Mailed: Jul. 24, 2003.
Office Action issued in U.S. Appl. No. 09/580,351; Date Mailed: Dec. 3, 2002.
Office Action issued in U.S. Appl. No. 09/580,352; Date Mailed: Jul. 8, 2002.
Office Action issued in U.S. Appl. No. 09/580,353; Date Mailed: Jul. 30, 2003.
Office Action issued in U.S. Appl. No. 09/580,508; Date Mailed: Jul. 15, 2003.
Office Action issued in U.S. Appl. No. 09/580,509; Date Mailed: Feb. 27, 2002.
Office Action issued in U.S. Appl. No. 09/584,165, Restriction Requirement; Mail Date: Jul. 29, 2003.
Office Action issued in U.S. Appl. No. 09/584,165; Date Mailed: Oct. 8, 2003.
Office Action issued in U.S. Appl. No. 09/704,838, Examiner Interview Summary; Date Mailed: Feb. 8, 2008.
Office Action issued in U.S. Appl. No. 09/704,838; Date Mailed: Feb. 6, 2004.
Office Action issued in U.S. Appl. No. 09/704,838; Date Mailed: Mar. 9, 2006.
Office Action issued in U.S. Appl. No. 09/704,838; Date Mailed: Apr. 22, 2009.
Office Action issued in U.S. Appl. No. 09/704,838; Date Mailed: May 5, 2008.
Office Action issued in U.S. Appl. No. 09/704,838; Date Mailed: May 27, 2009.
Office Action issued in U.S. Appl. No. 09/704,838; Date Mailed: Jul. 13, 2007.
Office Action issued in U.S. Appl. No. 09/704,838; Date Mailed: Aug. 1, 2005.
Office Action issued in U.S. Appl. No. 09/704,838; Date Mailed: Oct. 20, 2006.
Office Action issued in U.S. Appl. No. 09/704,838; Date Mailed: Oct. 30, 2008.
Office Action issued in U.S. Appl. No. 09/704,838; Date Mailed: Dec. 9, 2009.
Office Action issued in U.S. Appl. No. 09/927,560; Date Mailed: May 2, 2007.
Office Action issued in U.S. Appl. No. 09/927,560; Date Mailed: Aug. 25, 2006.
Office Action issued in U.S. Appl. No. 09/927,560; Date Mailed: Oct. 2, 2007.
Office Action issued in U.S. Appl. No. 09/929,735, Advisory Action; Date Mailed: Sep. 14, 2005.
Office Action issued in U.S. Appl. No. 09/929,735, Examiner Interview Summary; Date Mailed: Jun. 29, 2007.
Office Action issued in U.S. Appl. No. 09/929,735, Examiner Interview Summary; Date Mailed: Nov. 22, 2004.
Office Action issued in U.S. Appl. No. 09/929,735, Notice of Allowance with Examiner Interview Summary; Date Mailed: Feb. 15, 2007.
Office Action issued in U.S. Appl. No. 09/929,735, Notice of Allowance; Date Mailed: Apr. 30, 2007.
Office Action issued in U.S. Appl. No. 09/929,735; Date Mailed: Jan. 31, 2006.
Office Action issued in U.S. Appl. No. 09/929,735; Date Mailed: Mar. 5, 2004.
Office Action issued in U.S. Appl. No. 09/929,735; Date Mailed: Mar. 17, 2003.

Office Action issued in U.S. Appl. No. 09/929,735; Date Mailed: Jun. 27, 2006.
Office Action issued in U.S. Appl. No. 09/929,735; Date Mailed: Jul. 6, 2005.
Office Action issued in U.S. Appl. No. 09/929,735; Date Mailed: Sep. 24, 2003.
Office Action issued in U.S. Appl. No. 09/929,735; Date Mailed: Oct. 19, 2004.
Office Action issued in U.S. Appl. No. 09/930,786, Notice of Allowance with Examiner Interview Summary; Date Mailed: Jun. 24, 2009.
Office Action issued in U.S. Appl. No. 09/930,786, Notice of Allowance; Date Mailed: Nov. 12, 2009.
Office Action issued in U.S. Appl. No. 09/930,786; Date Mailed: Feb. 3, 2009.
Office Action issued in U.S. Appl. No. 09/930,786; Date Mailed: Jun. 16, 2005.
Office Action issued in U.S. Appl. No. 09/930,786; Date Mailed: Jul. 27, 2004.
Office Action issued in U.S. Appl. No. 09/930,786; Date Mailed: Nov. 18, 2004.
Office Action issued in U.S. Appl. No. 09/930,786; Date Mailed: Dec. 18, 2003.
Office Action issued in U.S. Appl. No. 09/976,443, Notice of Allowance; Date Mailed: Jun. 26, 2009.
Office Action issued in U.S. Appl. No. 09/976,443, Notice of Allowance; Date Mailed: Oct. 29, 2009.
Office Action issued in U.S. Appl. No. 09/976,443; Date Mailed: Jan. 7, 2009.
Office Action issued in U.S. Appl. No. 09/976,443; Date Mailed: Mar. 24, 2006.
Office Action issued in U.S. Appl. No. 09/976,443; Date Mailed: Mar. 29, 2005.
Office Action issued in U.S. Appl. No. 09/976,443; Date Mailed: Apr. 28, 2003.
Office Action issued in U.S. Appl. No. 09/976,443; Date Mailed: Sep. 8, 2004.
Office Action issued in U.S. Appl. No. 09/976,443; Date Mailed: Oct. 4, 2005.
Office Action issued in U.S. Appl. No. 09/976,443; Date Mailed: Nov. 15, 2006.
Office Action issued in U.S. Appl. No. 09/976,443; Date Mailed: Dec. 24, 2003.
Palma-Dos-Reis, A. "Designing Personalized Intelligent Financial Decision Support Systems" Decision Support Systems, vol. 26, 1999; pp. 31-47.
Press release, "Kana and Webline Team to Provide Industry's Most Comprehensive Online Customer Interaction Solution"; Business Wire; New York; Apr. 20, 1999, pp. 1-3, extracted on Internet from http://proquest.umi.com on Mar. 4, 2003.
Press Release, "Webline Communications' Products Selected by Trimark Investments to Increase Service On financial Advis . . . Web Site"; Business Wire; Mar. 22, 1999, extracted on Internet from Dialog database on Feb. 26, 2003.

Press Release, "Webline Communications Unveils New Customer Interaction Software Suite for Enabling Interactive E-Commerce and Customer Service" Business Wire, Apr. 20, 1999; pp. 1-3[1].
Press Release, "Webline Communications Unveils New Customer Interaction Software Suite for Enabling Interactive E-Commerce and Customer Service", Business Wire; New York; Aug. 16, 1999, pp. 1-4, extracted on Internet from http://proquest.umi.com on Mar. 4, 2003.
Probst, G. "Gerez Votre Budget Familial Sur FX—702 P" Micro-Systemes, Apr. 1983; pp. 133, 135, with English abstract.
Rachlin, R. et al. Accounting and Financial Fundamentals for Nonfinanancial Executives, Rachlin, R. and Sweeny, H.W.A. (eds.), AMACOM, New York, 1972; pp. 139-143.
Reeves, J. "Growing Your Practice Beyond Financial Planning: The CPA as Investment Adviser" CPA Journal, Sep., 1998; pp. 46-52.
Texas Instruments TI-89 Advanced Graphing Calculator, from http://www.amazon.com, hard-copy printed Mar. 18, 2003.
TI-89 and Voyage™ 200PLT product guide, and TI-89/92 Plus Graphing Calculator Tasks, these are evidents of commercial uses (copyright 1995-2003).
Waldron, H.C. "The Game of Life" Limra's Marketfacts, vol. 16, Issue 5, Sep./Oct.1997. Retrieved from the Internet: http://proquest.umi.com on Jun. 17, 2002; 5 pgs.
Waller, K.M. "Filling the Knowledge Gap" Journal of Accountancy, vol. 187, Issue 4, 1999. Retrieved from the Internet: http://proquest.umi.com on Jun. 21, 2002; 5 pgs.
Weverka, P. Microsoft Money 98 for Dummies. IDG Books Worldwide, Inc., Foster City, CA, 1997; pp. 21-29, 59-79, 149-161, and 207-229.
Williams, D.C. "Automating a Financial Planning Service" ABA Banking Journal, vol. 77, No. 10, 1985; pp. 82-84.
www.runmoney.com, May 2000, downloaded from Internet on Jan. 19, 2001.
Das, S. "Increasing Agent Autonomy by Learning From Events" PADD98; 2nd Int'l. Conf. on the Practical application of Knowledge Discovery and Data Mining; London, UK, 1998; pp. 241-260.
Office Action issued in U.S. Appl. No. 09/431,390; Date Mailed: Oct. 24, 2001 (as indicated on the USPTO file wrapper table of contents).
Office Action issued in U.S. Appl. No. 09/520,943; Date Mailed: Mar. 3, 2010.
Office Action issued in U.S. Appl. No. 09/930,786, Notice of Allowance; Date Mailed: Feb. 19, 2010.
Office Action issued in U.S. Appl. No. 09/976,443, Notice of Allowance; Date Mailed: Feb. 17, 2010.
Office Action issued in U.S. Appl. No. 09/704,838, Notice of Allowance; Date Mailed: Jun. 15, 2010.
Office Action issued in U.S. Appl. No. 09/976,443, Notice of Allowance; Date Mailed: Apr. 19, 2010.
Office Action issued in U.S. Appl. No. 09/930,786, Notice of Allowance; Date Mailed: Apr. 19, 2010.

* cited by examiner

*All values in current dollars as if inflation will be 0%. Inflation will be represented by discounting it from all compound growth estimates

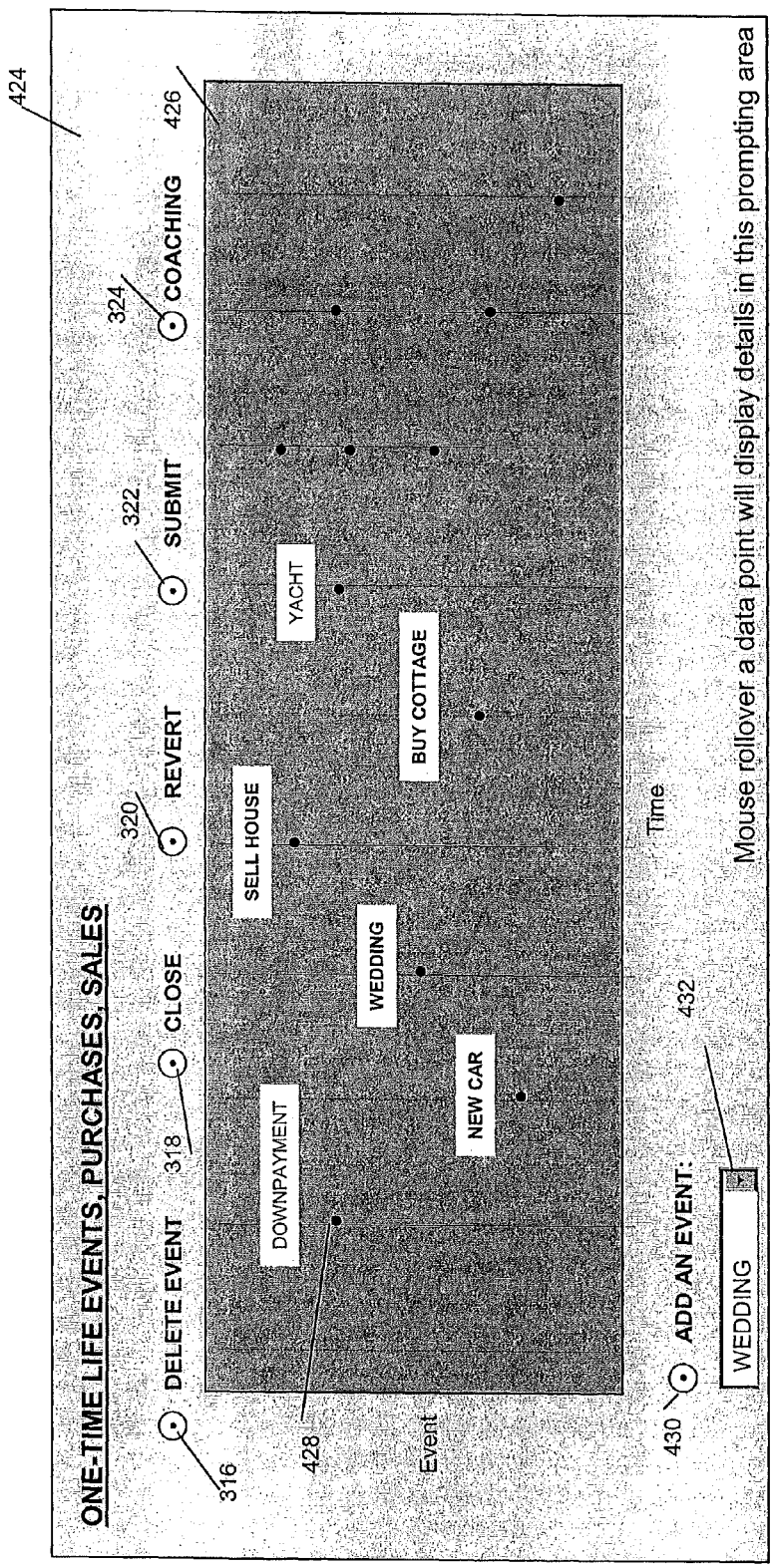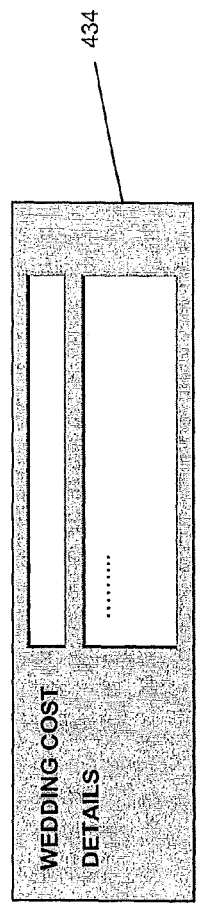
FIGURE 11

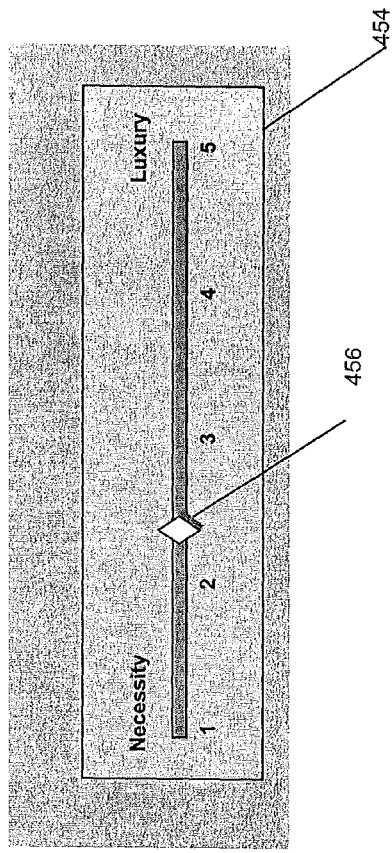
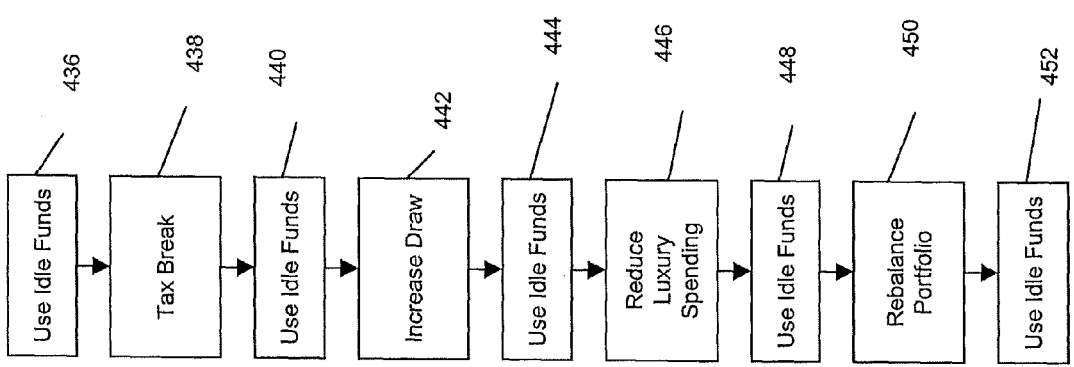
FIGURE 12

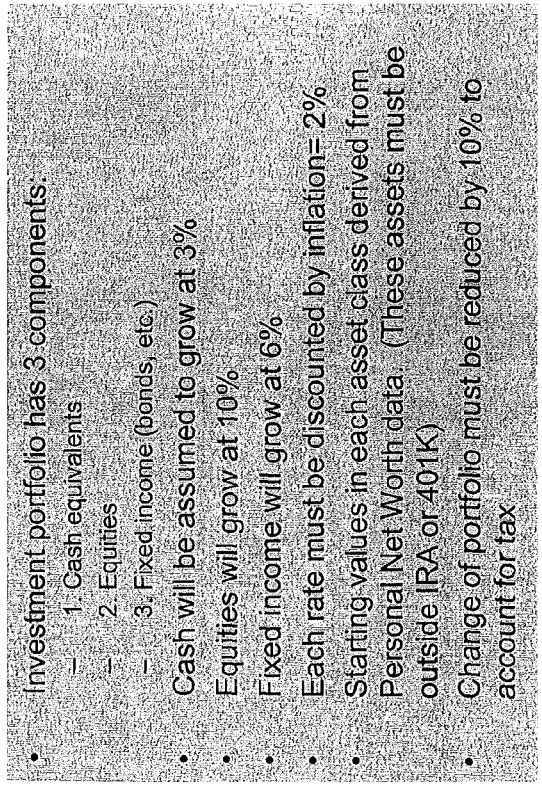
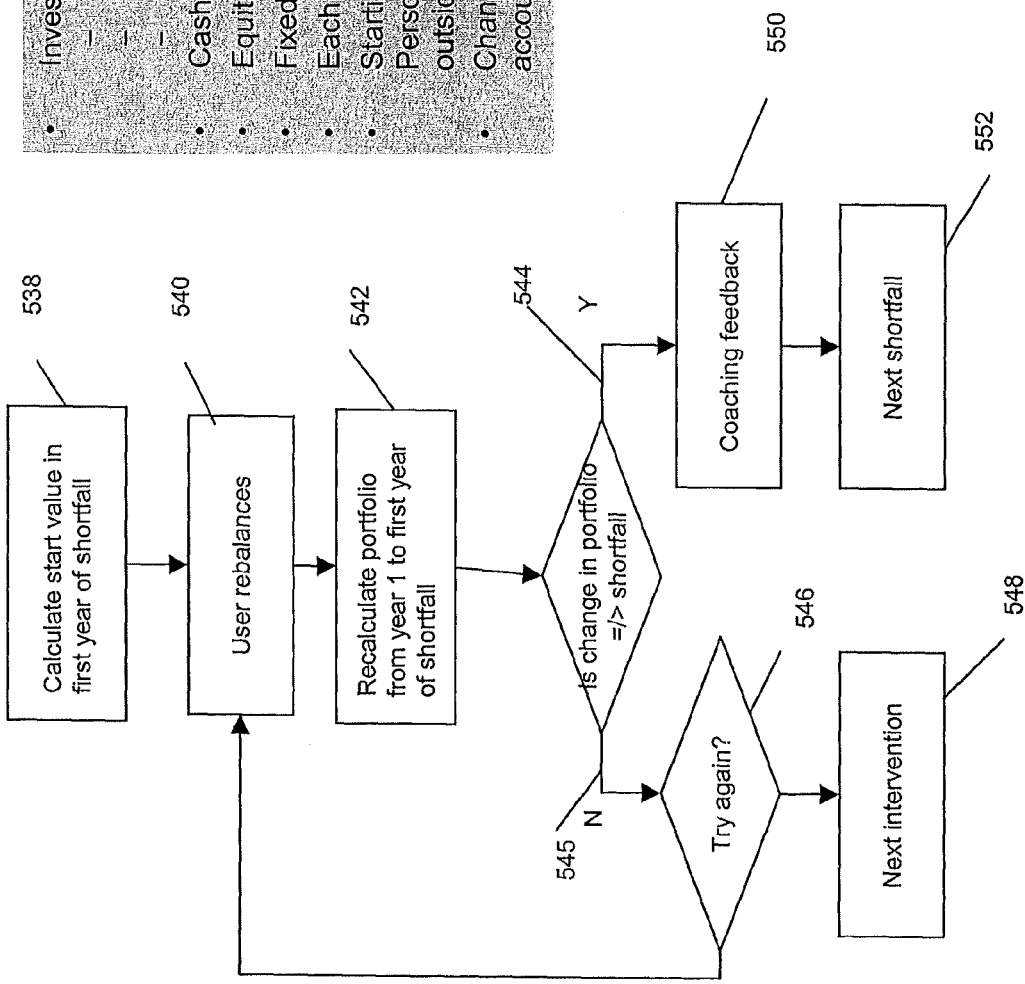
FIGURE 17

FINANCIAL PLANNING AND COUNSELING SYSTEM PROJECTING USER CASH FLOW

CROSS REFERENCE TO RELATED APPLICATIONS

The present application is a continuation of a parent application Ser. No. 09/705,288, filed Nov. 1, 2000, entitled "A FINANCIAL PLANNING AND COUNSELING SYSTEM PROJECTING USER CASH FLOW", of the assignee of the present invention, incorporated herein by reference.

Furthermore, the present application is a continuation-in-part of U.S. application Ser. No. 09/431,668 entitled "SYSTEM, METHOD AND ARTICLE OF MANUFACTURE FOR GENERATING A STRATEGIC FINANCIAL MODEL FOR MANAGEMENT AND ADVICE GENERATING PURPOSES" filed Nov. 1, 1999, and the U.S. application Ser. No. 09/580,273, entitled "SYSTEM, METHOD AND ARTICLE OF MANUFACTURE FOR FORECASTING AND STRESS TESTING USING A NETWORK-BASED PERSONAL INVESTMENT MANAGER" filed May 25, 2000 all of which we are incorporating herein by reference.

FIELD OF THE INVENTION

The present invention relates generally to computerized information systems and more particularly to web-enabled computer implemented financial modeling systems.

BACKGROUND OF THE INVENTION

Financially prudent individuals develop financial plans that aid them achieve their financial goals. Traditionally, many of these individuals have entrusted their financial plans to personal financial advisors.

More recently, however, some individuals have increasingly relied upon computer-based systems that organize their financial assets and liabilities and further provide them with a summary of their financial health. However, these systems tend to focus on the administrative aspects of financial planning without enabling the user to make reasoned choices about their financial futures. Furthermore, these systems are limited by their inability to dynamically analyze the financial goals. These limitations are counterproductive to the user's needs to develop and manage an integrated personal financial plan from an executive decision-making perspective.

Many existing financial management systems allow users to electronically organize their financial assets and liabilities. These systems typically focus on presenting the user with a summary of their financial transactions over a given period of time and their financial health, at a given instance. Furthermore, these systems typically rely on the user to continually update their personal financial data, although some systems allow access to user specific online data. As a result, these systems are merely data-driven calculators that are incapable of providing the user with meaningful financial coaching tailored to their financial intentions and expectations.

Similarly, some financial management systems present a static view of the user's financial health. These systems typically require the user to provide the most current financial data relating to their financial assets and liabilities. Consequently, when the user wishes to develop or update his or her financial plan, the user must input their most recent financial information. This problem is further exacerbated by the fact that these systems demand a lot of typing and guessing when the user enters financial data. This process is time-consuming and inefficient and does not promote an intuitive understanding of how complex financial variables interact to produce a sensible financial plan. A true user-friendly system would have to include a simple and intuitive graphical user interface. A Financial modeling is not very useful and accurate if the user does not submit all of his financial data because it is tedious to input all that data.

Another problem with many existing financial management systems is that the user is typically limited to managing the transactional details of their financial data. In these systems, the user is shielded from the planning and deciding aspects of developing their financial plan. Accordingly, the user learns very little from the process and remains heavily dependent on the system to provide an accurate summary of their financial health. These limitations further exacerbate the lack of trust inherent within the relationship between the user and the financial management system.

Financial coaching is another feature lacking from most of today's financial system. The use of a live advisor is expensive. Furthermore, a great deal of the time spent with a live advisor is spent on isolating the problem and not attacking the causes of it.

No system currently exists that dynamically incorporates all of the user's financial assets and liabilities into an integrated summary of their health. Individuals do not want to focus on the transactional details of their financial information. Instead, individuals desire to assume an executive decision-making role in managing their financial life. A financial management system is needed where the user is provided with an integrated summary of their financial health and is given personalized financial coaching tailored to his or her financial goals and intentions.

SUMMARY OF THE INVENTION

A system, method and article of manufacture are provided for generating an online, web-enabled financial model. A service level agreement that defines a level of financial management desired by a user is provided. A user is prompted to input financial information relative to the user. The financial information is stored in a database. A prospective cash flow for the user is aggregated over a predetermined amount of time based on the service level agreement and the financial information. The prospective cash flow is then output to the user. The financial information may include intended revenues and expenses of the user and/or external financial data. Preferably, the financial information includes external financial data including such things as mortgage interest rates and market inflation rates.

As an option, the user may be allowed to re-input the financial information if the prospective cash flow is deemed unacceptable by the user. The financial information would again be stored in a database. A prospective cash flow of the user would again be aggregated over a predetermined amount of time based on the service level agreement and the financial information. The prospective cash flow model would again be output to the user.

In one aspect of the present invention, a risk analysis evaluation is executed if the prospective cash flow is deemed acceptable by the user. In another aspect of the invention, coaching based on the financial information is output if the prospective cash flow is deemed acceptable to the user.

Furthermore, automated coaching both highlights projected problem areas and helps focus the user's attention on possible ways of attacking the problem areas. Furthermore, based on the negotiated service level agreement, the user may have access to a live advisor who can provide more specific coaching as well as the benefit of the experience and wisdom of an experienced human advisor.

The system of the present invention allows the user to model his or her life intentions in terms of a projected cash flow into the future using an online, web-enabled system. The model highlights possible problem areas, and offers automated and live coaching on ways to resolve the issues. The user interface model is designed to simplify the input of the massive amount of data necessary for a useful financial model. The model further allows the financial institution providing the service to the user to tailor various financial products to fit the user's specific needs.

These and other advantages of the present invention will be apparent upon a study of the following descriptions and drawings.

BRIEF DESCRIPTION OF THE DRAWINGS

The foregoing and other objects, aspects and advantages are better understood from the following detailed description of a preferred embodiment of the invention with reference to the drawings, in which:

FIG. 11 is an illustration of an one-time life events interface;

FIG. 12 is an intervention flow diagram and an illustration of an interface for setting a luxury index for each spending;

FIG. 17 illustrates a flow diagram for a rebalance portfolio intervention;

DETAILED DESCRIPTION OF THE PREFERRED EMBODIMENTS

Figure 1:
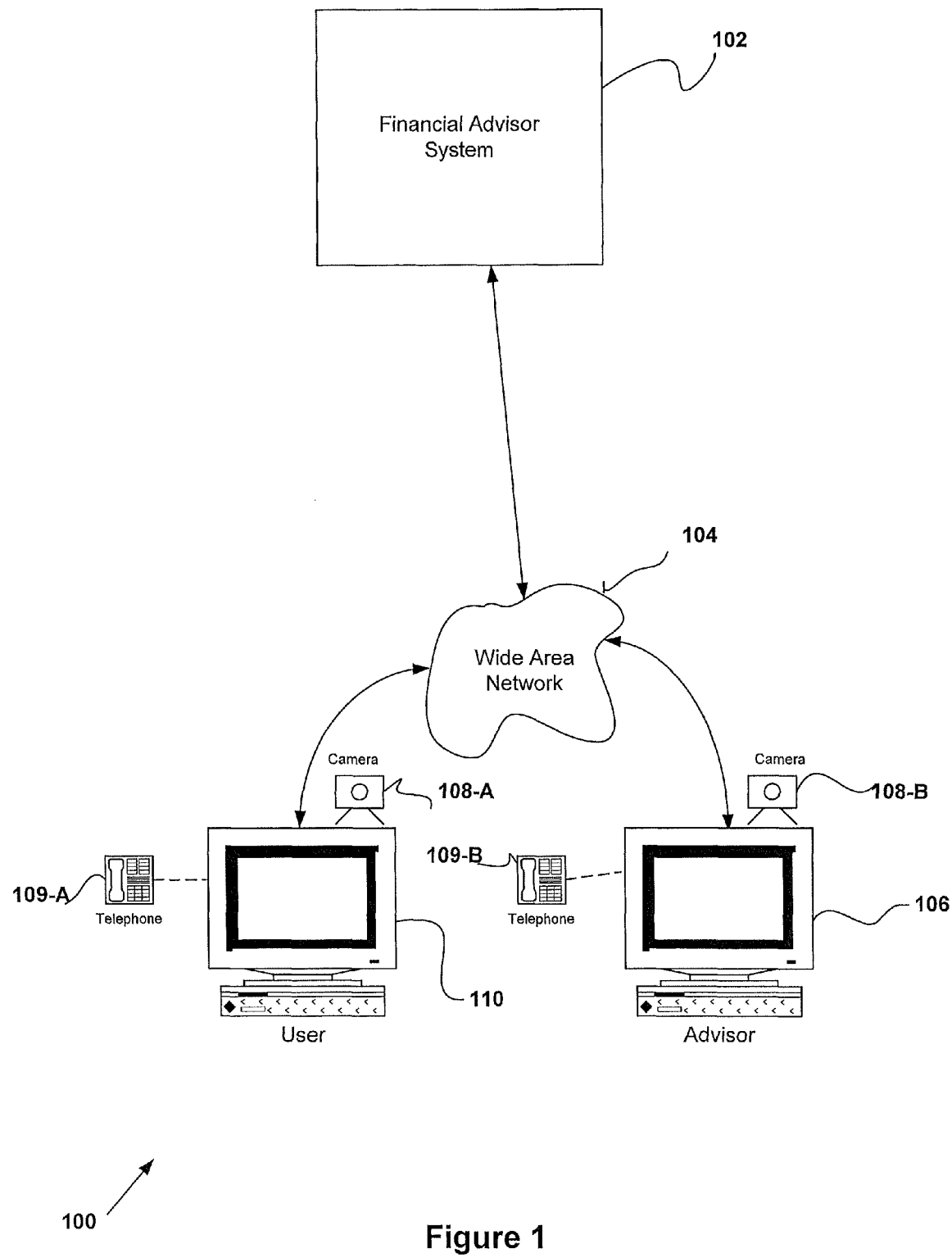
FIG. 1 illustrates a representative system architecture in accordance with a preferred embodiment.

FIG. 1 is an illustration of one embodiment of a financial management information system, in accordance with the present invention, for providing personalized financial coaching in a collaborative computing environment. In FIG. 1, financial management system 100 includes a financial coaching system 102 connected through a wide area network connected to the Internet 104 to the live advisor terminal 106 a user terminal 110. The wide area network of the present invention 104 is connected to or is the Internet. The Internet is based on the TCP/IP communication protocol first developed by the Department Of Defense in the 1960s. The present invention may be implemented using other protocols and other networking system, including wireless networks, the Network File Service (NFS) protocol used by Sun Microsystems or a Novel network based on the UDP/IPX protocol.

Preferably, the financial advisor system 102 communicates with the user through any number of devices such as handheld wireless personal organizers, pagers, cellular telephones, land telephones and regular desktop computers. All of the above equipment can act as a user terminal 110.

The user (e.g. individuals or company representative seeking financial advice) may access the system using a user terminal 110 (e.g. personal computer). A typical user computer terminal would be described in more detail in FIG. 3. The user computer is preferably equipped with software to receive live streaming video and/or still pictures over the wide area network 104, from the advisor video camera 108-B. Preferably, the user terminal 110 is further equipped with a video camera 108-A and software to transmit live streaming video from the user, across the network 104 to the live advisor at the advisor terminal 106. Access to the live financial advisor 106 and all other services provided by the Financial management system is controlled and channeled through the Financial Advisor system 102. The user can access the financial coaching system 102 through the Internet 104 or by telephone 109-A. A user telephone call is channeled through a call center discussed further subsequently in FIG. 2 to the Financial Advisor System™ and to the live advisor 106.

The live advisor terminal 106 is preferably equipped with the video camera 108-B for transmitting live streaming video. The live advisor 106 may further communicate with the user via a telephone 109-B.

Figure 2:
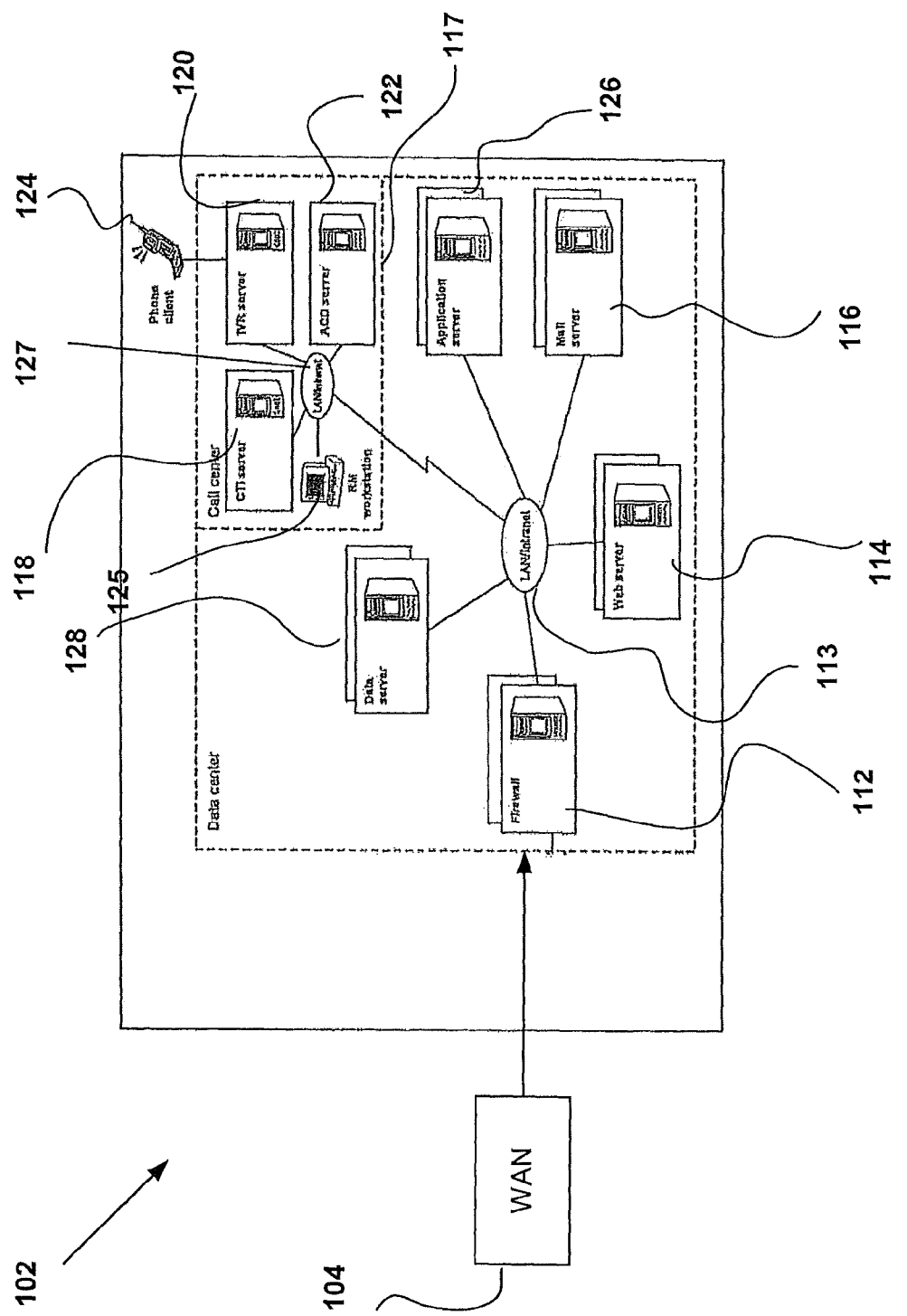
FIG. 2 is a block diagram of the financial management system.

FIG. 2 is a block diagram of an implementation of the financial coaching system 102. The user may access the system through the Internet 104 and through a firewall server 112. A Web server 114 provides the user with a personalized website providing an interactive interface between the user, the financial advisor and financial management system 100. The financial advisor system 102 further comprises a mail server 116, an application server 126, a call center 117 and a data server 128, all interconnected through a local area network 113. The local area network (LAN) 113 may be any wide area intranet system or the internet.

Security is important in any financial system. The firewall server 112 controls the access to the financial advisor system. The purpose and functionality of a firewall server is to prevent access to the system by unauthorized users and it would be appreciated by one skilled in the arts. Firewall servers are available through a variety of vendors and have become a standard feature of any secure system used as the primary defense against intruders and hackers.

The web server 114 provides a personalized interactive web page environment for the user to operate in once he accesses the system. The web page is acting as the web interface between the financial system Web pages may be created using the Hyper Text Markup Language (HTML), scripting languages such as Java Script™ or Pearl™ as well as Java™ applets, Visual Basic, Shock wave, Cold Fusion, etc. Creation of customized web page using any of the above programming languages is well within the scope of one skilled in the arts. The personalized web page provides an environment and an interface for the user to interact with the financial advisor system 102. As an example, in one embodiment of the present invention, by selecting an appropriate icon from the interactive personalized website, the user is able to learn, plan, decide, transact and monitor, his financial model.

The mail server 116 handles electronic mail communication between the user and the financial advisor system 102. The Mail server 116 may operate using any standard protocol such as Simple Mail Transfer Protocol (SMTP) and it is within the scope of the knowledge of one skilled in the art.

The application server 126 is where the various modules of the financial advising system reside. The modules include the various coaching engines, the LifePath and the portfolio modeling sub-systems. The applications may be implemented in many programming languages, including the object oriented programming languages such as C++ or Java™ and may be based on any platform such as UNIX™, Apple OS™ or Windows™ and NT™. Furthermore, the coaching engine rules for various coaching engine can reside on a data server 180.

Alternatively, the user may also interact with financial coaching system 102 through a telephone 124. The user's call is channeled through the call center system 117. The call center 117 includes an Automatic Call Distribution (ACD) server 122, an Interactive Voice Response Server (IVR) 124, a Computer Telephony Integration (CTI) server 118 and a RM workstation 125, all interconnected through a Local Area Network or intranet 127. The local area network 113 may also be used in interconnecting the various servers of call center. When the user calls into the financial advising system 102 using a remote telephone 124, the IVR sever 124 receives the user's telephone call. The IVR system greets callers, prompting them for identification, and providing some information automatically. The Automatic Call Distributor (ACD) server 122 distributes the call using the Internet Protocol (IP) over the network, to the appropriate live coach. The Computer Telephony integration server (CTI) 118 acts as the link between the live advisor's telephone call and the workstation based applications and allows them to automatically work together. As an example, when the IVR server 120 obtains some information about the calling user, this information is delivered to the live advisor's workstation 106, so the advisor does not have to request the same information again. Once the telephone call is properly routed to the live-advisor, the user can use other means of communication such as electronic mail or White board™ simultaneously while he is interacting with the live advisor.

The Data server 128 stores user input data and supplies the application Server 126. The data server 128 includes outside database sources from which the financial coaching system 102 can draw information such as actuarial data about customers and historical price data on securities from sources such as Reuters, user financial information such as banking and portfolio information in other financial institution, and market information such as the day's closing numbers for various market indices as well as individual stock securities pricing information. Formatted in the Open File Exchange (OFX) format, now the accepted Internet standard used by programs such as Quicken™ and MS Money™ the data server through the firewall can easily exchange information with the outside world and specifically the user.

It should be noted that various computing platforms could be used to access the financial management system of the present invention. For example, a networked personal computer environment, a client-server system, a mainframe terminal environment, WEB TV terminal environment, dumb terminal environments can be used to access the financial management system of the present invention. Depending upon the user's needs, a client-server system (the web servers) may be the most preferable computing system for implementing the financial system of the present invention. Furthermore, the representation of each server such as an application server or a data server, is a logical representation. The actual physical systems may be distributed over many servers, or be included on a single machine.

Figure 3:
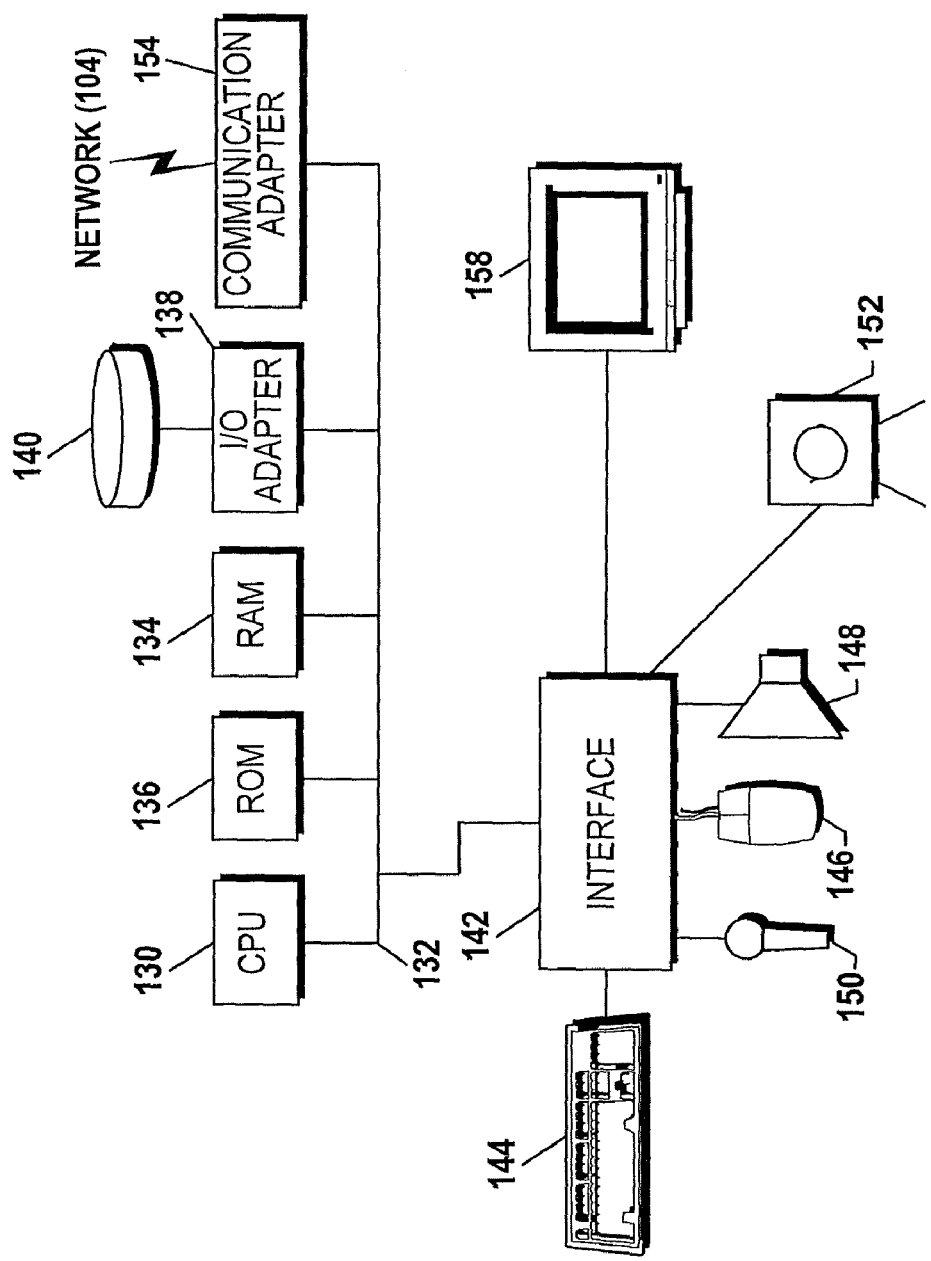
FIG. 3 is a block diagram of a representative hardware environment in accordance with a preferred embodiment.

FIG. 3 is a computer system architecture that can be used in implementing the present invention. This computer system architecture can be used to implement a user workstation, or any of the servers called for in FIG. 2. The present invention may be practiced on any of the personal computer platforms available in the market such as an IBM™ compatible personal computer, an Apple Macintosh™ computer, Solaris™ or UNIX™ based workstation. The operating system environment necessary to practice the present invention can be based on Windows™, NT™, UNIX™, Apple Operating System™, or open source operating system software such as Linux™ and Apache™. Furthermore, the computer system can support a number of processes. As appreciated by one skilled in the art, the processes may be written in any of the available programming languages including object oriented programming languages such as Java™ or C++.

The computer system architecture depicted in FIG. 3 includes of a central processing unit 130, such as a microprocessor, a read only memory (ROM) 136, a random access memory (RAM) 134, an input and output adapter 138, a storage device 140, and interface 142 connecting a plurality of input and output device such as a keyboard 144, a mouse 146, a speaker 148, a microphone 150, a video camera 152 and a display 158, and a system bus interconnecting all the components together. The computer may also include such devices as a touch screen (not shown) connected to the bus 132 and communication adapter 154 such as a dial up modem, a Digital Subscriber Line (DSL) modem or a cable modem, for connecting the workstation to a communication network 104 (e.g., the interne). The storage device 140 can be any number of devices including but not limited to hard disk drive, a floppy disk drive, a CD-ROM device, a DVD device, a tape device, and removable magnetic storage devices such as a Jazz™ drive or ZIP™ drive. There are therefore a number of computer readable media encompassed by the system depicted in FIG. 3, including but not limited to RAM 134, ROM 136, storage device 140, and storage accessible over the network connection 104.

Figure 4:
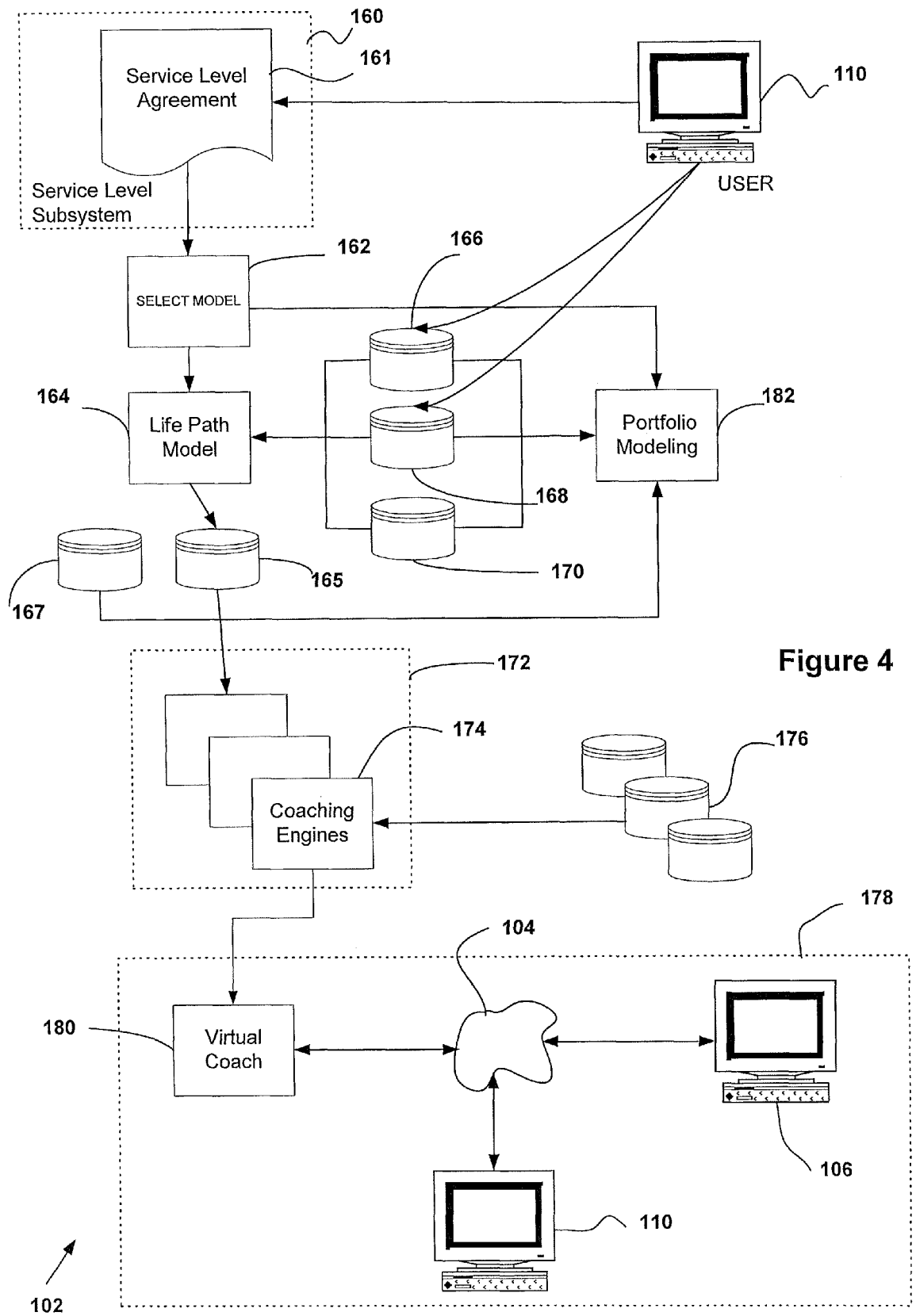
FIG. 4 is a block diagram of a financial management system.

FIG. 4 represents an illustration of the data flow of a financial coaching system 102 of the present invention. A user using for example the user computer 110, preferably connects to the financial coaching system 102 over the Internet 104. After authentication by a firewall server, the user at a user terminal 110 enters the Financial coaching system 102 at the service level subsystem 160. The service level agreement provides the level of services to which the user is entitled. Once the user has negotiated a service level agreement 161, he is prompted to select the model to be used in operation 162. In one embodiment of the present invention, the level of service and support selected in the service level agreement 160 controls the user's access to different modeling tools.

In a preferred embodiment of the present invention the LifePath model may be the hub of the financial institution's relationship. The LifePath model provides data to all coaching engine allowing customized coaching output to be dispensed to the user based on his unique financial situation. The LifePath model combines all the pertinent financial information about a user in one coherent and comprehensive picture and models the user's life intentions into an aggregated cash flow system over a user selected period of time. Using the terminal 110 the user inputs his life intentions in terms of projected income and expenses as well as assets and liabilities. The LifePath model 164 maintains an interactive dialog between the user and financial management system 100. The LifePath model integrates the financial information available about the user in accordance with the user's service level agreement 160 to create an aggregate forecast of cash flow over the user's lifetime. The financial information available about the user includes the user's life intentions data 166 and the user's external financial data 168. In a preferred embodiment of the present invention, the user's external financial data can include current checking account information from the user's bank or data related the user's investment retirement plan. By incorporating external data 168 into the LifePath model 164, the system is capable of dynamically analyzing the financial needs of the user and providing the user with an understanding of their financial health at any point with minimal input form the user. As discussed above, personalized service level agreement 160 can optionally allow the user to limit the system's and/or advisor's access to the user's external financial data 168.

Additionally, LifePath model 164 also integrates external market data 170 into the aggregated forecast of the user's cash flow. In one embodiment of the present invention, external market data 170 includes information such as current mortgage interest rates or market inflation rates. Access to both internal and external databases is controlled by the user's service level agreement. The LifePath modeling tool 164 is further discussed in a related U.S. application entitled LifePath Counseling by the same inventors as the present invention, application Ser. No. 09/705,288, filed on the same day as the present application and incorporated herein by reference.

Alternatively, the user may by pass the LifePath model and start with a portfolio modeling tool 182. The availability of the portfolio modeling tool is based on the user's service level agreement 161. The user would supply his financial portfolio information to the financial advising system 102, either directly using the user terminal 110 or indirectly through the Internet 104, by accessing a multiplicity of databases 166, 168 and 170, and accessing information such as his securities portfolio at a particular brokerage firm.

A financial portfolio modeling tool 182, is an interactive tool that has access to the all the information available to the LifePath model 162, such as the user's life intentions data 166, the user's external financial data 168, as well as external market data 170. User insight data 167 and aggregated data from the LifePath model 165 is also available to the portfolio modeling tool. As a result the user has little to input and may start using the portfolio model 182 very quickly without the need to do a lot of tedious data input. The financial portfolio modeling also allows the user to access a computer coach and/or a live advisor based in part on the service level agreement.

An alternative embodiment allows the user to use the LifePath model 164 and set his long term financial goals and then use the portfolio modeling tool 182 to adjust his investment portfolio to better achieve his long term financial goals.

The LifePath interactive financial model may capture the customer's intentions at the start of the relationship and displays them as lifetime cash flow requirements. Customer data and LifePath information combine to form a deep understanding of the customer's financial needs at each stage of life. Using dynamic, interactive multimedia, it quickly captures the customer's intentions and expectations about an ideal future. This flushes out some issues which trigger the initial discussions in the relationship. It also supports estimating the lifetime value of the customer and the appropriate levels of service. The data from this model combines with insight from product and transaction history as well as real time input from the abundance of interactive models to power rule-based advice engines. This automated coaching leverages the advisor's time so that a broad customer based can be profitably supported. Configured using sliders and other interactive controls, there is little typing to slow the process down. The controls build a linear graphic representation of a LifePath which models predictable life transitions over time more effectively then data-driven calculators. Sales opportunities, lifetime customer value and appropriate fee structure are now more accurately identified.

Coaching generation subsystem 172 comprises one or more advice or coaching engines 174. Coaching engine 174 dynamically analyzes the financial needs of the user in accordance with the user's service level agreement. Furthermore, the coaching engine 174 is configured to operate with coaching engine rules repository 176. Coaching engine rules repository 176 is a collection of rules-based business logic that produces clear automated advice. Coaching engine rules repository 176 generates its advice using LifePath data 165 and user insight data 167. Alternatively the investment portfolio data from the portfolio modeling tool 182 triggers the coaching engines advise. In one embodiment of the invention, user insight data 167 includes transaction history, product or purchase history, as well as demographic information about the user.

In addition to providing coaching to the user, advice generating subsystem 172 may also help the user to consider product solutions. As an example, in one embodiment of the present invention, the coaching engine 174 may help the user consider and include deposit products and loan products in their financial plan. For example, the coaching engine 174 may help the user consider a certain mortgage or bridge financing. Similarly, the coaching engine 174 can also suggest the user the need for financial products such as home improvement, line of credit, or credit card products. Coaching engine 174 can also have access to product information from various financial institutions (not shown). Accordingly, the user can request additional information about the various products recommended by the system.

The user can access their financial plan or LifePath model using user terminal 110. User terminal 110 is part of collaborative computing environment 178 and is in data communication with virtual coach 180 and the advisor terminal 106 through communications network 104. In, one embodiment of the present invention, communication network 104 is the Internet.

The advice and product solutions generated by the advice generating subsystem 172 are presented to the user through virtual coach 180. Virtual coach 180 presents the product recommendation with accompanying rationale. The user may or may not wish to contact the dedicated financial advisor for additional advice or information. Because the system generates reasoned financial coaching in accordance with the user's financial needs and intentions, the financial advisor is able to operate more productively. Furthermore, the user can test different scenarios by altering the data captured by LifePath model 164. Each scenario can then be analyzed by coaching engine 174. The virtual coach 180 is further described in the related U.S. application named "Automated Coaching For A Financial Modeling and Counseling System", application Ser. No. 09/705,255, by the same inventors as the present invention, filed on the same day as the present application and incorporated herein by reference. Furthermore, the LifePath model is further described in the related patent titled: "A Financial Planning and Counseling System Projecting User Cash Flow", application Ser. No. 09/705,288, by the same inventors as the present invention, filed on the same day as the present invention and herein incorporated by reference.

In addition to virtual coach 180, the user can optionally interact with a dedicated financial advisor 106 through the Internet 104. In an embodiment of the present invention, financial advisor 106 is located in a call center 118 on a relationship manager's workstation 125. Financial advisor 106 may interact with user 110 using various multimedia interaction tools, for example, still-shot images or video streaming. Accordingly, the user is able to buttress the coaching received from virtual coach 180 with advice from a dedicated financial advisor operating at terminal 106. In many situations, the live advisor's input may be necessary, since he brings a level of expertise and experience no automated coaching system may match. However, since the automated coaching has framed the problem for the user and the live advisor, both can immediately start analyzing alternative solutions in a focused and cost efficient fashion. The term advisor as used herein is not necessarily limited to licensed individuals legally authorized to give advice.

Depending on the level of service the user has negotiated with the service level agreement 161, he may have multiple modeling tools available in the financial management system. In alternative embodiments of the present invention, modeling tools for analyzing various financial instruments such as bonds, reverse mortgages, option contracts and a like may be available to the user.

Figure 5:
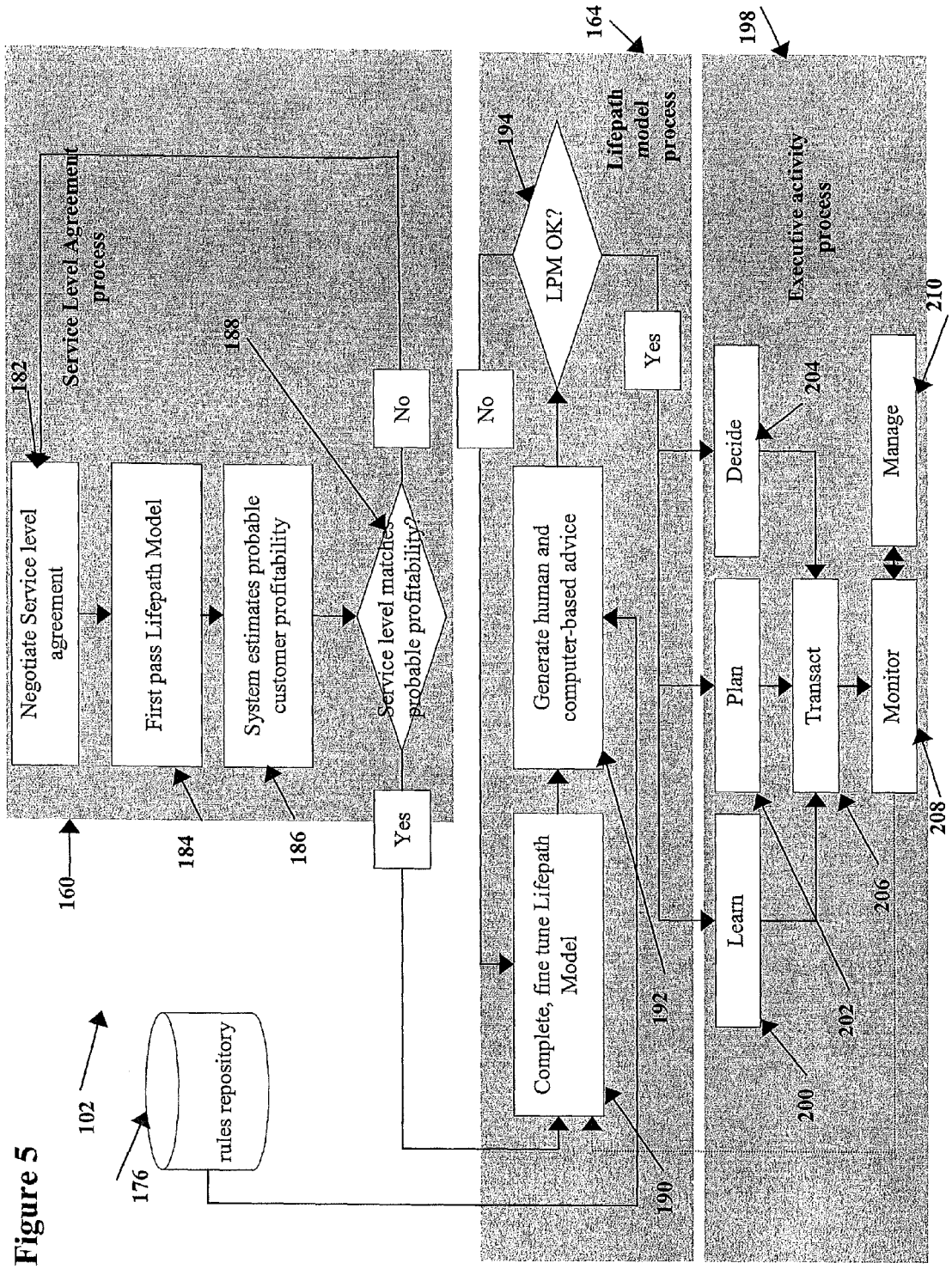
FIG. 5 is a flow diagram of a financial management system.

FIG. 5 illustrates a flow diagram of an embodiment of the financial advisor system 102. The service level agreement process 160 may be one possible entry point for the user into the financial coaching system 102, where the user negotiates a service level agreement and sets the level of financial service desired. The service level agreement 161 defines the user's desired level of advisor support as well as limiting the system's access to user provided information.

After the service level agreement 182 has been negotiated, the user makes a first pass through the LifePath model 164. Note operation 184. In one embodiment of the present invention, the user may input its life intentions in terms of revenue intentions and expense intentions and assets and liabilities. The system then aggregates the information into a cash flow analysis over a user's income and expenses over a user defined period of time. The model may also include external data related to the user's finances. After a first pass through the LifePath model (step 184), the system may estimate the probable customer profitability 186 based on the user's financial plan given the user's life intentions and other financial information. If the user's service level agreement does not match the probable profitability 188, the user can renegotiate the service level agreement negotiation or revisit LifePath model step 184 to modify the model parameters, and then prompt the system to re-estimate the probable user profitability 184.

After fine tuning the LifePath model (step 188), context sensitive automated computer coaching 192 is provided to the user using a coaching engine based on business logic rule-based engine. The rules repository 176 supplies business rules. The automated coaching engine 174 may highlight for the user periods within his LifePath model which need special attention, such as a projected cash deficit or cash surplus. Based on the coaching from the automated coaching engine 174 and/or a live advisor, the user may accept or reject the LifePath model 194. If the user rejects the LifePath model, he may further modify and fine tune the LifePath model in step 188 until he is satisfied.

In one embodiment of the present invention, the LifePath model process 196 is followed by an Executive activity process 198 where the system allows the user to assume an executive decision-making role in making their financial future. The executive activity process 198 enhances the user's ability to manage his or her financial life from an executive perspective. For example, through interaction with the system, the user learns 200, plans 202, or decides 204 the respective elements of their financial plan. Since the LifePath model 164 projects the user's cash flow in the future, the user may use the LifePath modeling tool 164 to change input variables such as savings, salary and expenses, and observe the long term effect of the changes on his financial goals. The intuitive graphical display of the LifePath model allows the user to get an immediate qualitative as well as quantitative feedback of the effects of the incremental changes on his long term goals. After engaging in these activities, the user may choose to initiate a transaction 206 based upon the advice generated by the system. In alternative embodiments of the present invention, both the automated coaching and the live advisor may recommend various financial products suitable to the user's financial situation. Furthermore, after initiating the transaction 206, the user may monitor 208 and/or manage 210 the status of the products selected. In one embodiment of the present invention, the learn icon 200 allows the user to obtain information on the products recommended by the automated coaching engine or the live advisor. The system may have to access outside databases to access third party products which may be beneficial to the user's financial situation. The rule based coaching further may check the governmental regulations and impacts of adding or deleting a specific product to the user's financial portfolio. The governmental regulations analyzed can include an analysis of the tax consequences of using a certain product specific to the user.

Figure 6:
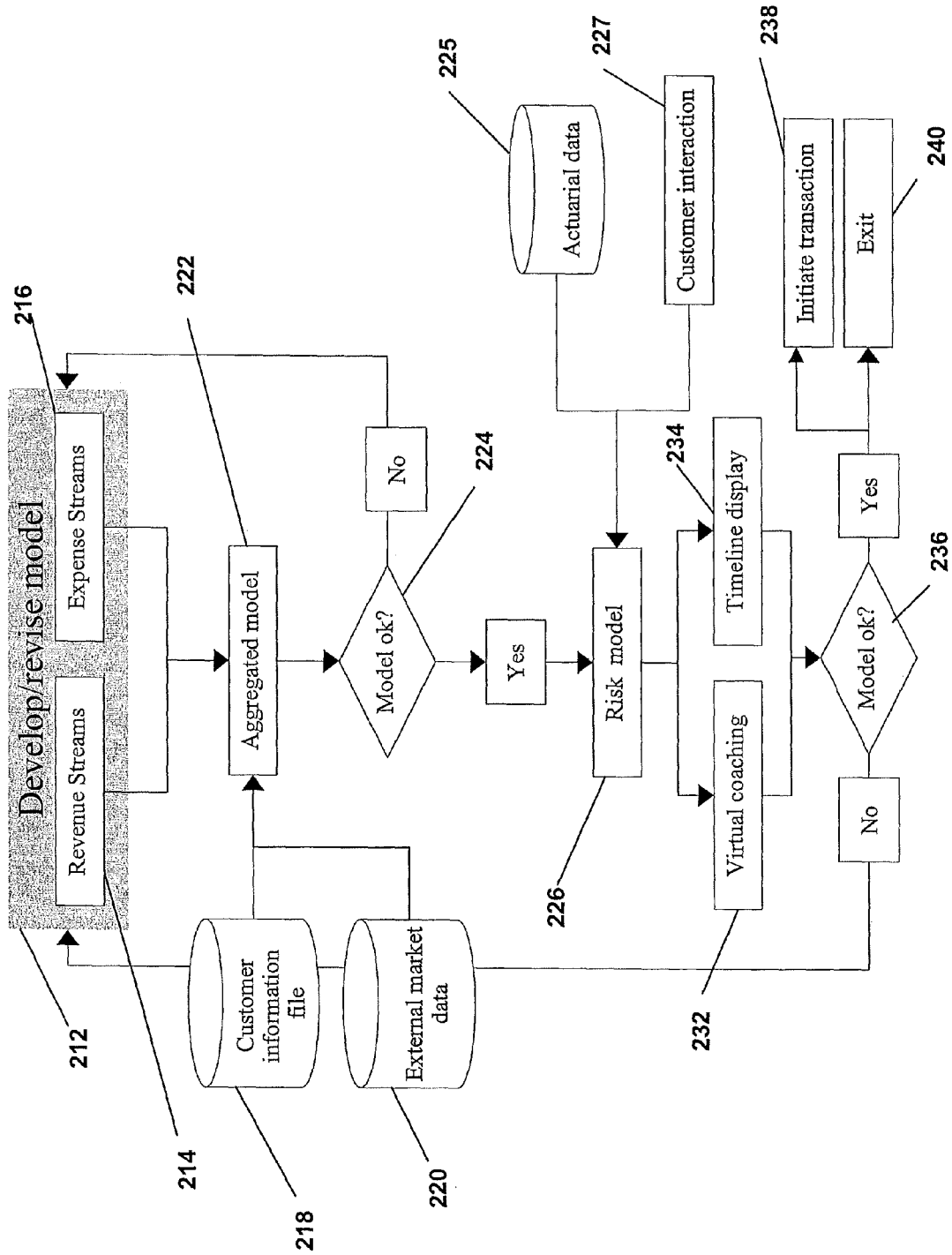
FIG. 6 is a LifePath model flow diagram.

FIG. 6 is a logical flowchart of a process followed by the LifePath model 164. Initially, the user typically develops 212 their LifePath model by inputting their life intentions. As discussed earlier, the life intentions may be expressed as revenue intentions or income 214 as well as expense intentions or expenses 216. The user income 214 and expense 216 information can be fed to the system from a customer information file database 218. This information may be combined with external market data 220 from external databases making the process of inputting personal financial information more interactive. After developing the LifePath model (step 212), an aggregated modeling module is executed 222. The user can verify that the model produced by the aggregated modeling module is acceptable 224. If the model is not acceptable, the user can return to revise their life intentions 212. Otherwise, if the model is acceptable, the user can execute the risk modeling module 226. As discussed above, the risk modeling module assists the user in understanding their exposure to financial risk by illustrating how their ideal financial model would be impacted by a typical life crisis.

After the risk modeling module has been executed 226, the user may be provided with automated coaching 232 as well as a time-line display 234 of their aggregated forecast of their cash flow. Once again, the user may have the opportunity to verify that the model produced is acceptable 236. If the model is not acceptable, the user can return to revise their LifePath model in accordance with their financial life intentions 212. If the LifePath model produced is acceptable, the user can either exit the system 240 or initiate a transaction 238.

Figure 7:
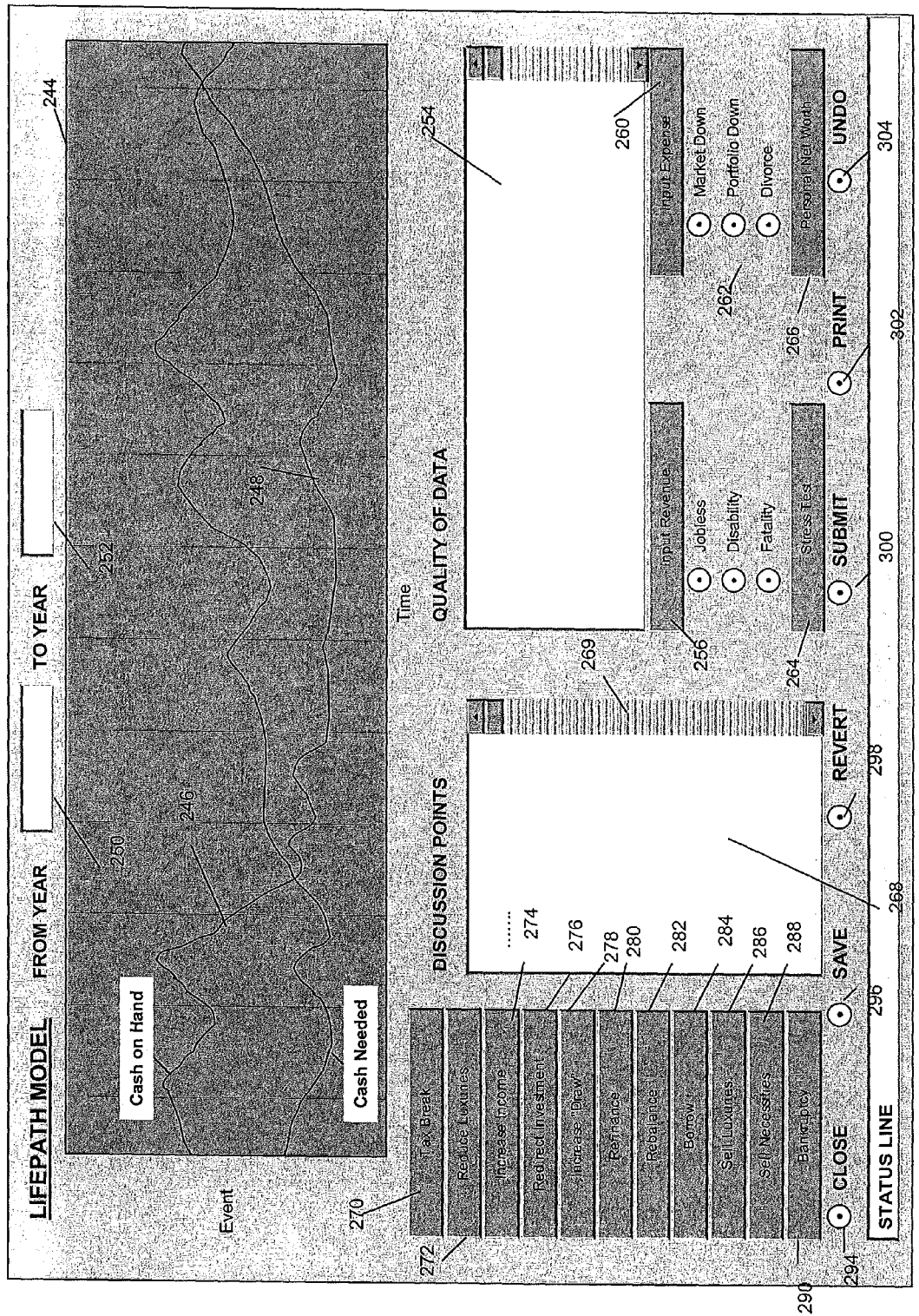
FIG. 7 is an illustration of a LifePath model interface.

FIG. 7 is an embodiment of a screen layout for the LifePath model 164. The model display window 244 depicts displays the user's cash on hand 246 and the user's cash needed 248 graph over a period of time. The time span covered by the model is defined by the user using the "From Year" window 250 and the "To Year" window 252. The data point corresponding to the model is fed to the system by the user by selecting the Input Revenue icon 256 and the Input Expense icon 260. In one embodiment of the present invention the revenues 256 include salary, investment, pension, alimony, disability, annuity, fees, loan or others. The expenses 260 include housing, transportation, entertainment, education, health care, vacation, savings, personal, investment, insurance, tax, loan and miscellaneous.

Life events can be accounted for by selecting one of the event icons 262. In one embodiment of the present invention the life event includes joblessness, disability, fatality, market downturn, portfolio downturn, divorce, fire, theft and collision. Based on actuarial data the model would calculate the likelihood of a certain dollar impact on the user's long term cash flow. Once one or more life risk events are selected, the user applies the event to the LifePath model by selecting the Stress Test icon 264. The personal Net Worth icon 266 would calculate the effect of the user selections on the user's personal net worth.

The LifePath model may be used to highlight future negative or positive cash flows periods. Through automated coaching the system can focus the user's attention to possible ways of solving the cash flow problem. Preferably, automated coaching is dispensed to the user in syntactically correct natural language using the coaching window 268. A scroll bar 269 is used to scroll up and down the coaching strings.

Based on the automated coaching, the user may select a variety of possible actions to solve the cash flow issues. The user may select Tax break icon 270 to take advantage of possible tax breaks. He may reduce his luxury spending 272, increase income 274, redirect investment 276 to increase his income, increase "draw" from his personal business 278, refinance 280 a business or home, rebalance his investment portfolio 282, borrow 284, sell luxuries 286, sell necessities 288 such as a car and even declare bankruptcy 290. A series of functional icon allow the user to close the screen 294, save the changes to the LifePath model 296, revert back to the previous state of the model 298, submit the changes 300, print 302 and undo the changes 304.

Figure 8:
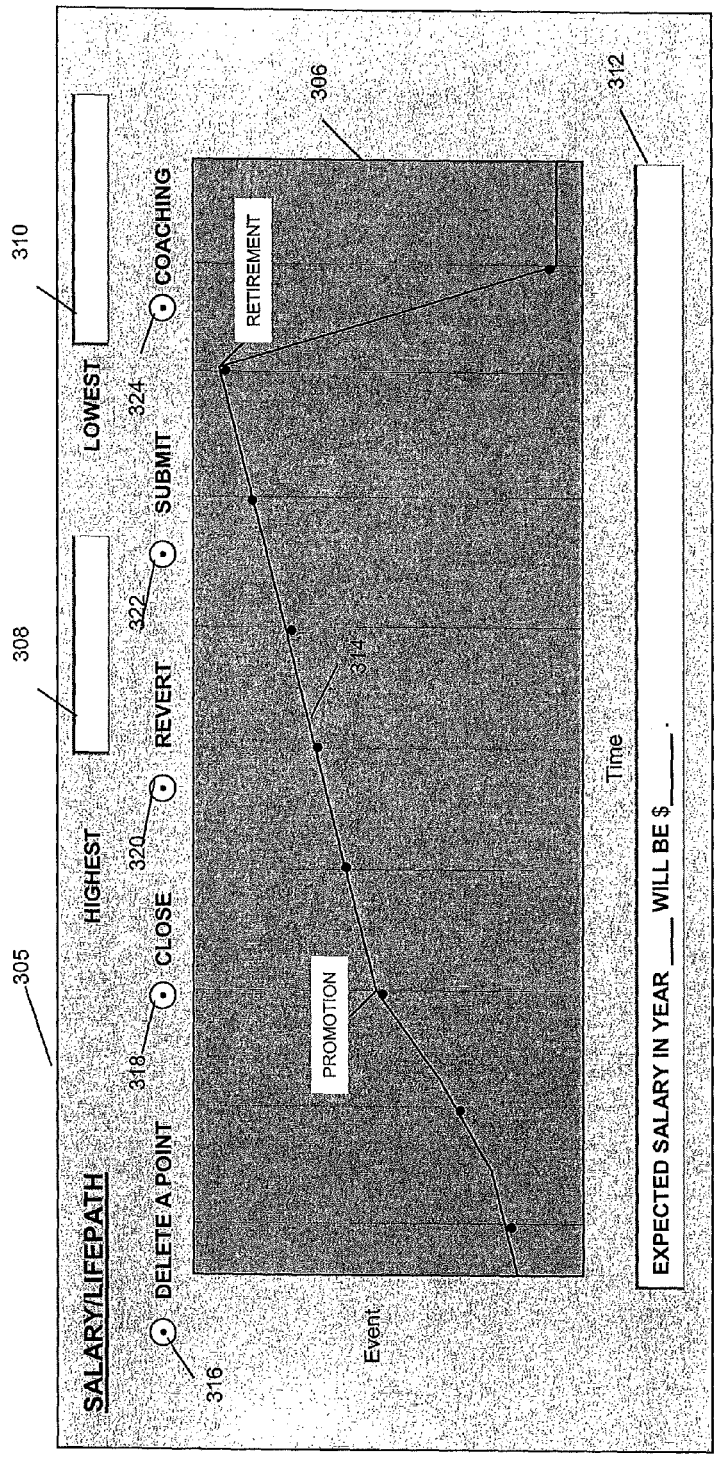
FIG. 8 is an illustration of a salary input interface.

FIG. 8 depicts an embodiment of how to input, edit and model the user's salary stream 305. The display window 306 depicts the user's salary stream over a user selected time period. The user inputs his estimated highest 308 and lowest 310 expected salaries over the time span of the LifePath model covers. The user will input his estimated income in the input field 312 on a year by year basis. The income will include salary, spouse salary, regular draw from the business, loan repayment, family contribution, alimony, disability, rental income and other salary.

In one embodiment of the LifePath Model, the interface used to plot time series for revenue and expenses is interactive. Each is represented as a timeline between any two defined dates and each annual point 314 of timeline can be interactively dragged up or down on its vertical axis. This device makes it easy to estimate changes and rough in long stretches of time without the tedium of conventional spreadsheet data entry. The interactive data entry process can iterate as needed until the model is as complete as possible.

Function icons allow the user to delete a point 316, close the salary input screen 318, revert to a previous state 320, submit 322 the salary data for incorporation into the model, and request for automated or live coaching on how to do and what to do at any given specific time. The cash outflow or expense may be entered in the same way and includes household expenses, investment, transportation, vacation, child support, rental and insurance payment.

Figure 9:
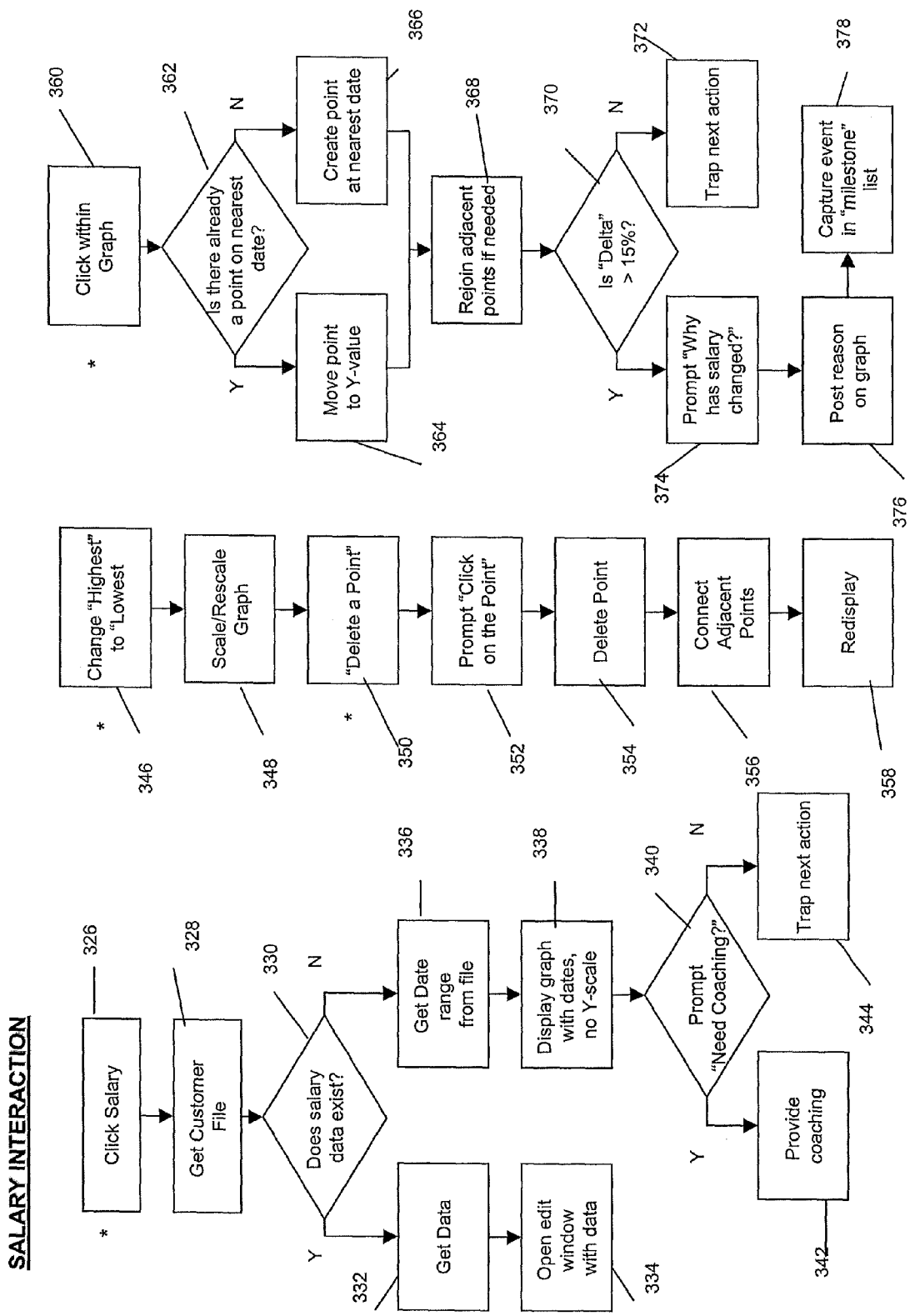
FIG. 9 is a logic flow diagram for a salary input screens, various icons and functions.

FIG. 9 depicts a logical flow chart of the salary input screen. The user may start by clicking the salary icon 326. The system pulls the customer file 328 and checks to see if salary data exists 330. If salary data already exists, the system would get additional data 332, and open the edit window 334.

If no salary data exists, the system first gets a date range from the file 336. Next, the system displays a graph with dates but no Y-scale 338. In one embodiment of the present invention, the financial planning and counseling system prompt the user to see if he needs coaching 340. If the user needs coaching, the system may provide automated interactive coaching 342. If user does not require coaching, then the system traps the user's next action 344.

The user can rescale the displayed graph by changing the highest to lowest salary point 346. If the highest and/or the lowest salary figures are changed or are entered for the first time, the LifePath model changes rescales the graph 348. The user can delete an annual point 314 by clicking on the delete a point icon 316. Note operation 350. Once the delete a point operation is selected, the system prompts the user to click on the specific point to be deleted 352. The marked point is then deleted. Note operation 354. The system automatically connect the two adjacent points on either side of the deleted annual point 356 and redisplays the income graph 358.

In the preferred embodiment of the present invention, the salary graph 306 can be directly modified by clicking on it. Note operation 360. The LifePath model checks for points nearest to the date selected 362. If there is no annual point near the selected point on the graph, a point is created at the nearest annual point 366. If there is an existing annual point near the annual point 364 is moved to the new Y-value. The system rejoins the adjacent points if needed 368 to incorporate the new annual point location. If the Y-movement of the new annual point is less than 15% of the previous Y-value the system goes on to trap the next action 372. If the Y-movement of the annual point is greater than 15%, that is if the income delta is greater than 15% 370, then the system prompts the user for an explanation. Note step 374. The user inputted reason is posted on the graph 376 and the system captures the event in the "milestone" list 378. The milestone list would include events such as promotion or retirement.

Figure 10:
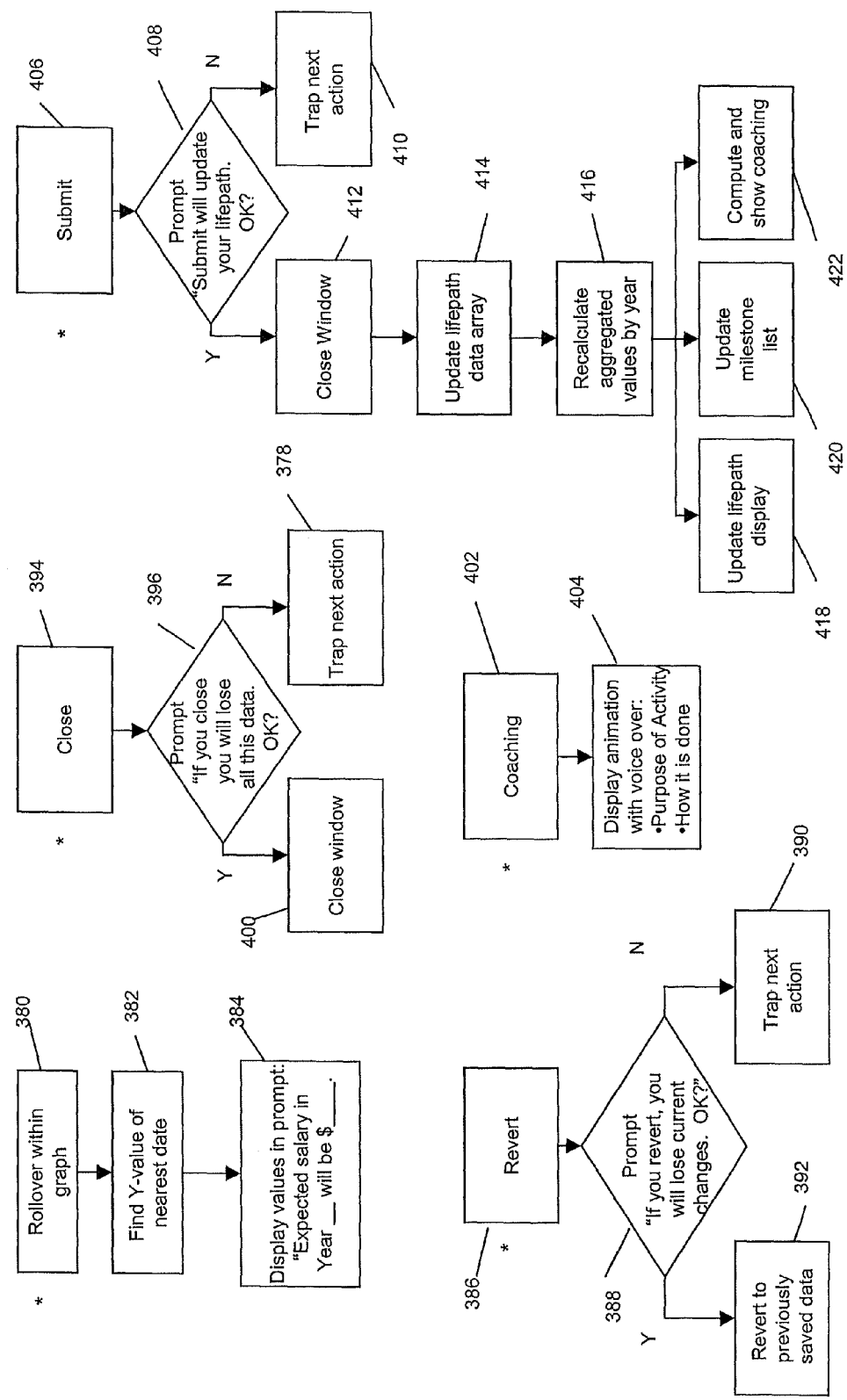
FIG. 10 depicts more logic flow diagram for a salary input screen.

FIG. 10 is depicting a logic flow diagram for an embodiment of the present invention. When the mouse rolls over within the graph 380, the system finds the Y-value of the nearest date 382 and displays the X value or the year and Y values or the salary for that annual point 384.

The user may begin the revert process 386 by selecting the revert icon 320. The financial planning and counseling system (the LifePath system) informs the user that the current changes would be lost in a revert operation, and prompts the user for a confirmation 388. If the user response is negative the system moves to trap the next action 390. If the user response is positive, the model reverts to previously saved data 392.

By selecting the close icon 318, the user may close 394 the current window. The system informs the user that without saving the data, all data would be lost upon closing of the window and prompts the user for a confirmation 396. If the user response is negative, the system moves to trap the next action. Upon a positive user response, the system closes 400 the salary window 305.

In a preferred embodiment, automated coaching may be provided throughout the process of using the LifePath model including data entry. The user may request coaching by selecting the coaching icon 324 and start the coaching process

402. In one embodiment of the present invention the system displays coaching in the form of animation with voice over explaining the purpose of the activity and how it is done 404. Other coaching methods such as syntactically correct English coaching strings, streaming video clip or even a live advisor could be made available to the user based on the user service level agreement.

Upon the selection of the submit icon 322 the user lunches the submit process 406. The system asks the user if they want to update the LifePath model with the new data entered 408. If the user replies negatively the system moves on to trap the next action 410. If the user responds positively 412, the system closes the salary window 412, updates the LifePath data array 414, recalculates aggregated values by year 416, and updates the LifePath display 418 as well as the milestone list 420 and compute and displays appropriate coaching 422.

FIG. 11 is an embodiment of a screen for entering, editing and modeling one time income and expense events such as buying or selling a house. The time event graph 426 is populated with one time events that affect the user's financial situation and need to be accounted for if a realistic financial picture is desired. The one time life event points 428 are entered by selecting the "add an event" icon 430. Specific events are selected from a drop down list box 432. An unlimited number of non-standard entries as well as user specified entries can be added to the list. When the specific One-Time life event is selected from the drop-down list box 432, a life event detail window 434 opens up, where the user inputs the details such a cost breakdown about the specific event. The initial value will come from the dialogue box. The submit icon 322 will trigger changes in cash balances displayed in aggregated LifePath. Sales and purchases of assets trigger changes in personal net worth. Depreciation and appreciation are calculated based on industry norms and using actuarial data from outside databases if needed. The life event's impact on taxation is also calculated. The LifePath model highlights possible future cash flow issue and coaches the user through automated coaching or a live advisor on how to deal with the specific issue.

FIG. 12 outlines possible interventions that could be recommended to the user in resolving the cash flow issues in an embodiment of the present invention. The user attacks the cash flow issue first by the use of idle funds 436. The user may be directed next to take advantage of any available tax breaks 438. If the tax break results in idle funds to become available, the user can use it to preempt his problem 440. An increase in draw may be applied to reduce a negative cash flow 442. The idle funds available from an increase in draw would be applied to the cash flow problem 444. Reducing luxury spending 446 would also result in idle funds 448 becoming available for cash flow problem resolution. The user may opt to rebalance his portfolio 450 with a possible resulting increase in idle funds 452 which would be available to eliminate cash flow issue.

Every asset in the user's Personal Net Worth and every expense cash flow must be rated as a luxury or necessity on a scale of 1 to 5. This rating is done using a window 454 such as the one depicted in FIG. 12. A simple user interface such as a slider 456 is used to rate each asset and expense on a simple necessity to luxury index. This is referred to as the luxury index. After each intervention the user should get a chance to try again or revise his intervention input before the changes are posted to the LifePath model. After each intervention, the user gets a feedback on how the intervention affected the shortfall or surplus.

Figure 13:
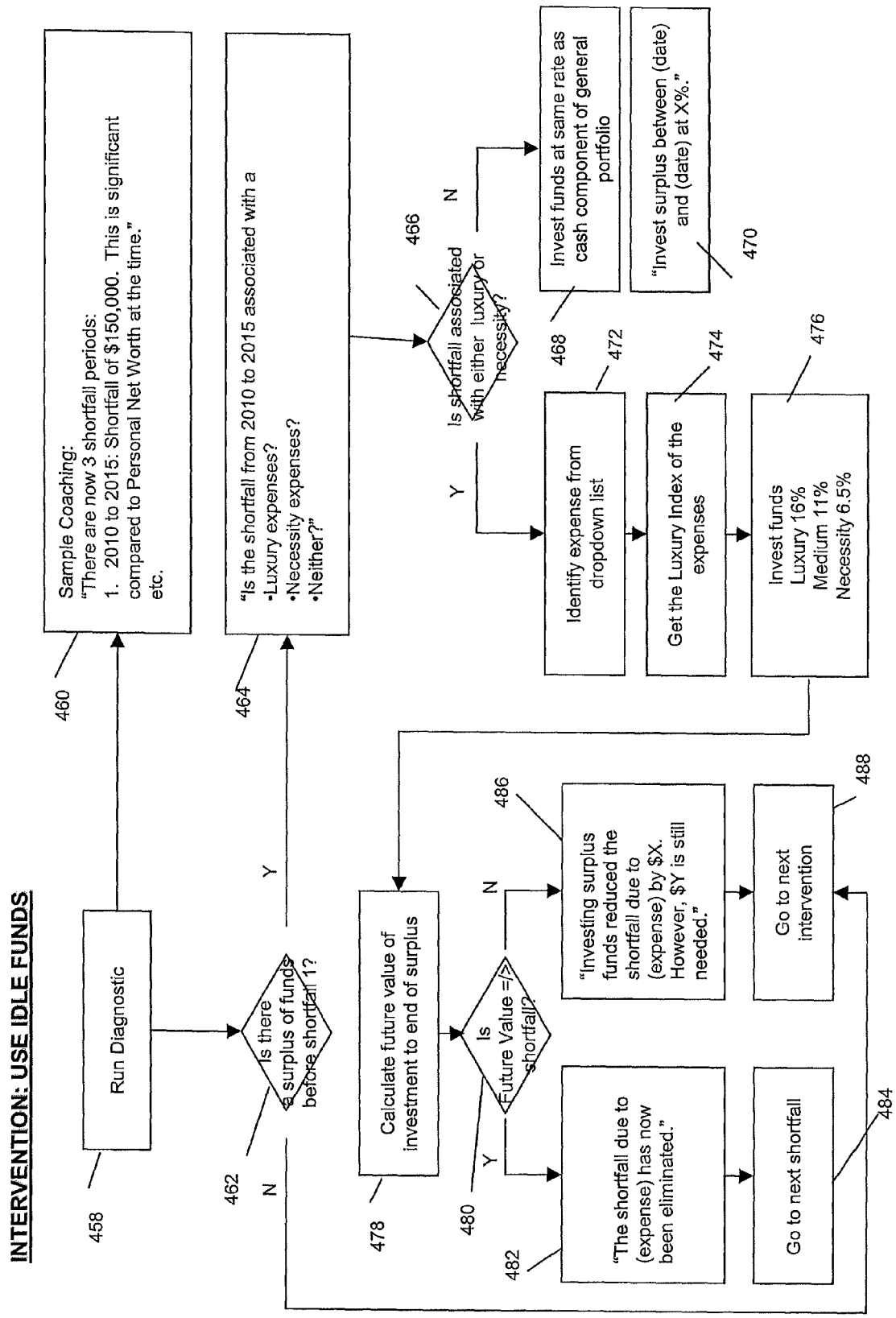
FIG. 13 is a flow diagram for a use of idle funds intervention.

FIG. 13 outlines the recommendation to use idle funds in the event of a shortfall in one embodiment of the present invention. To begin the system runs a diagnostic routine 458, with resulting automated coaching such as the one depicted in 460. The system checks for a surplus of funds before the shortfall. Note operation 462. If there is no surplus of funds before the shortfall, the system may move on the next possible intervention 488. If there is a surplus before the shortfall 464, the system may look to see if the shortfall is due to either a luxury or necessity spending 466. If there is no shortfall associated with a luxury or necessity the system coaches the user to invest funds at the same rate as other cash components of the general portfolio 468 and more specifically to invest the surplus for a given period of time at a specific rate 470. If the shortfall is associated with a luxury or necessity expense, the system prompts the user to identify the expense from the dropdown list 432. Note operation 472. The system then gets the luxury index of the particular expense 474, and automated coaching suggest to the user to invest funds at specific rates based on the luxury index 476. The system calculates the future value of the surplus invested to the end of the surplus period 478. The system compares the invested value to the future shortfall. If the shortfall is smaller than the value of the invested idle funds, the system prompts the user that the shortfall has been eliminated 482 and goes to the next projected shortfall 484. If the value of the invested idle funds is less than the shortfall then the system may prompt the user that the invested surplus reduced the projected shortfall by $X and $Y is still needed to eliminate the remaining shortfall 486. The system then moves to the next intervention 488.

Figure 14:
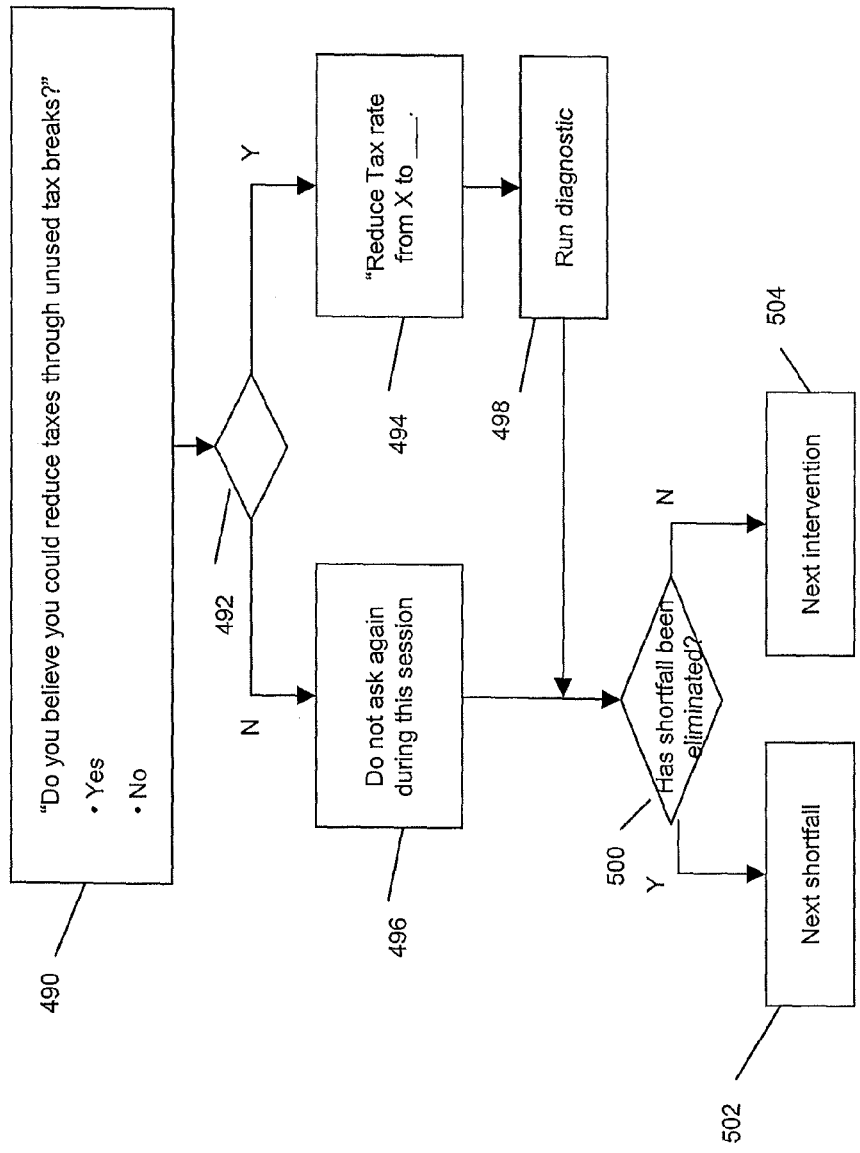
FIG. 14 is a flow diagram for a tax break intervention.

FIG. 14 illustrates another possible intervention to reduce or eliminate a possible projected cash shortfall in the future in an embodiment of the present invention. The system prompts the user for possibilities of reducing taxes through unused tax breaks 490. If there is such a possibility, the system recommends a specific tax rate reduction 494 and runs the diagnostic engine 498 to see if the shortfall has been eliminated 500. If the shortfall has been eliminated, the system moves on to the next shortfall 502. If there still is a shortfall, then the system moves to the next possible intervention 504. If there are no unused tax breaks available 496, then the system goes through the operations 500 and 502 or 504 depending on whether the shortfall persists or not.

Figure 15:
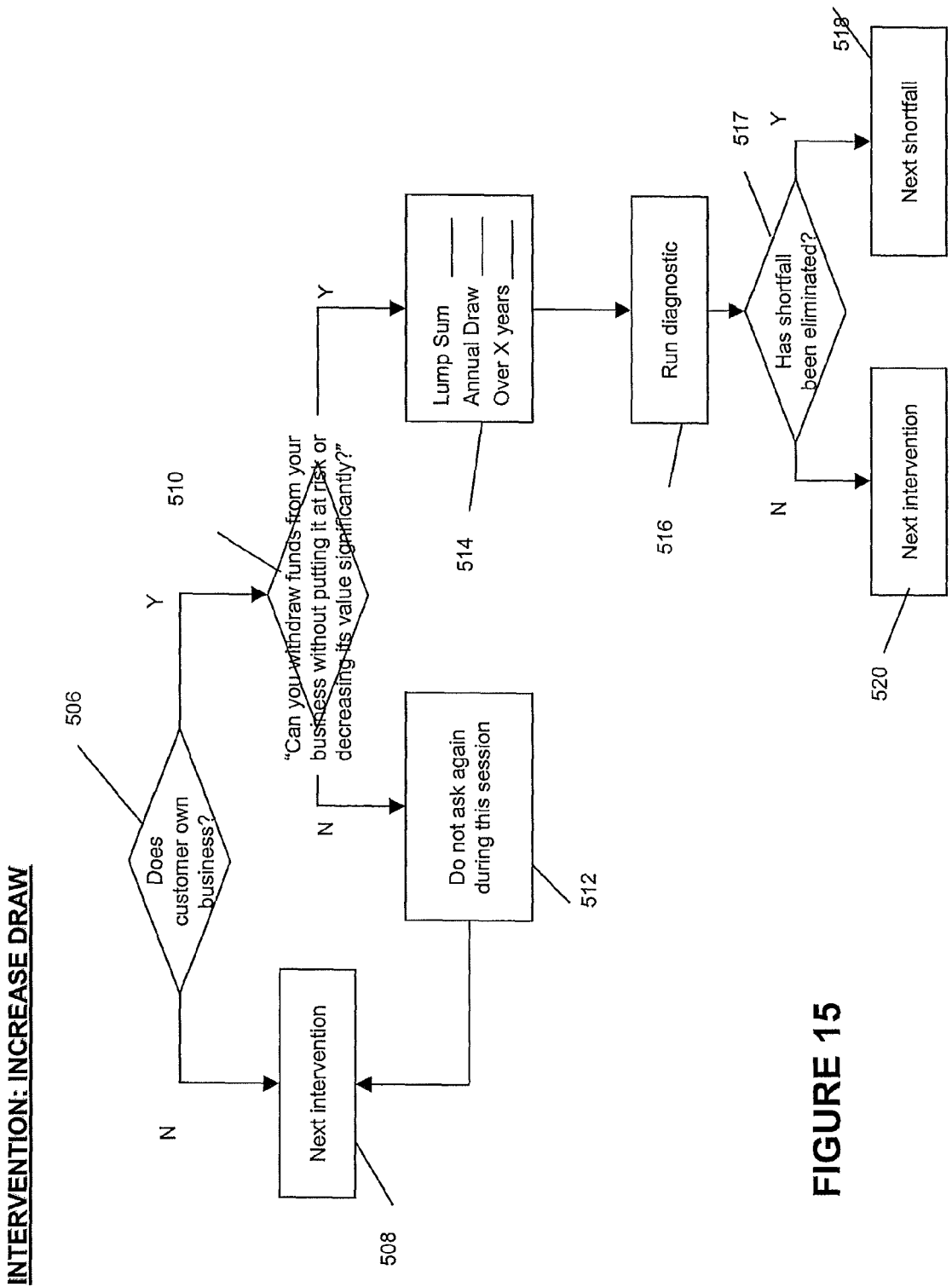
FIG. 15 is a flow diagram for an increase draw intervention.

FIG. 15 illustrates another possible intervention to eliminate a projected cash flow shortfall in accordance with an embodiment of the present invention. The LifePath system may at first ascertain whether the user owns a business 506. If the user is not a business owner the system moves on to the next intervention 508. If the user does own a business the user is asked if he can withdraw funds from the business without putting it at risk or decreasing its value significantly 510. If such a withdrawal is not possible 512, the LifePath system moves on to the next intervention. If the possibility of withdrawal from the business exists, the user inputs possible options of withdrawing a lump sum, an annual draw or a draw over X years and a dollar figure for each possibility 514. The LifePath system runs its diagnostic engine 516, and if the shortfall is eliminated the system moves to the next shortfall 518. If the shortfall persists 517, the LifePath system moves on to the next intervention 520.

Figure 16:
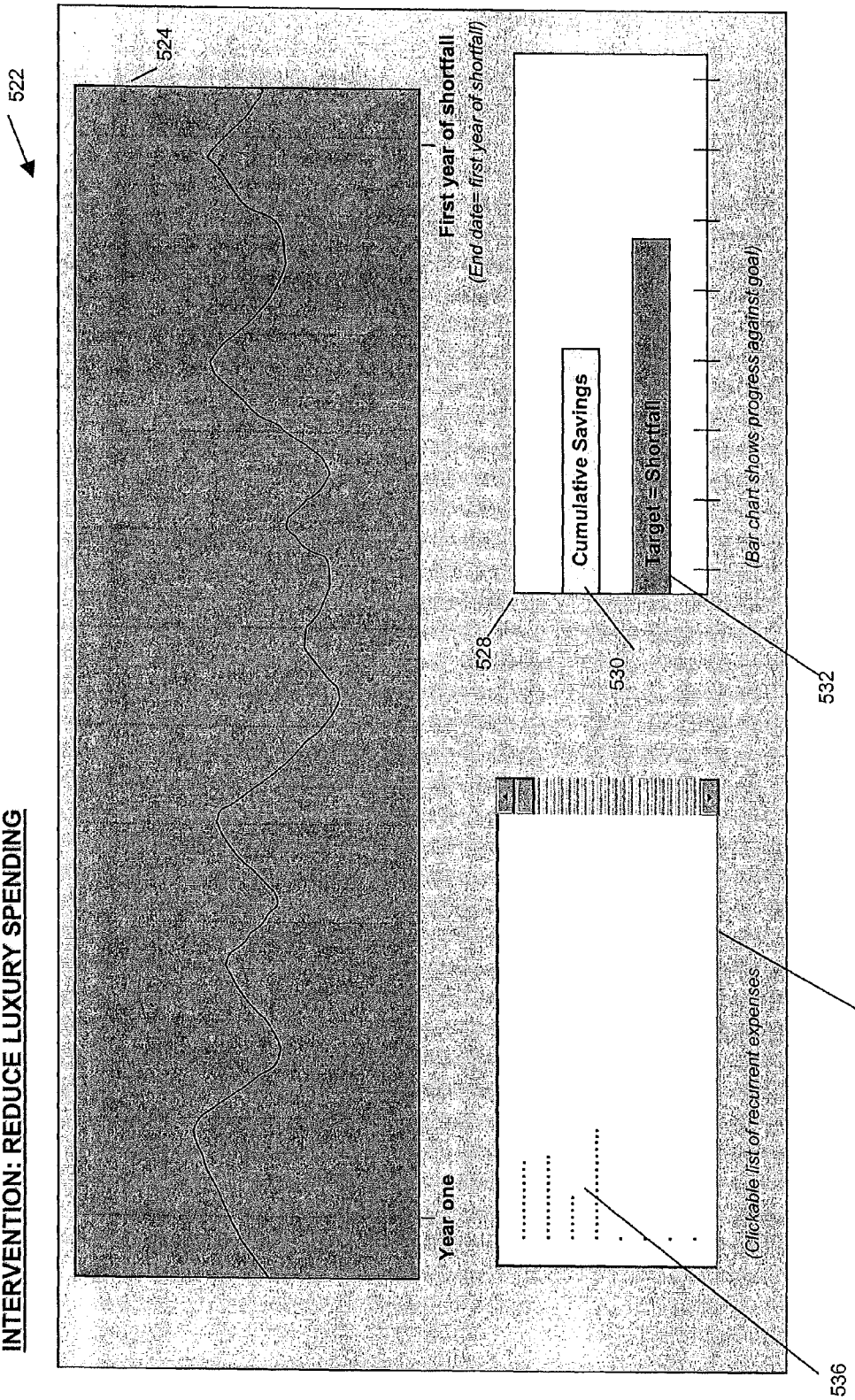
FIG. 16 is an illustration for reducing luxury spending intervention.

FIG. 16 illustrates a screen shot for reducing luxury spending in accordance with an embodiment of the present invention. To reduce a projected cash shortfall in the future, the user may reduce his luxury spending. The luxury spending reduction screen 522 helps the user identify and reduce possible luxury expenses he may reduce and would demonstrate to the user effect of the reduction on the projected shortfall. The window 524 shows the graph of the cash flow from year one to the first year of the shortfall. A bar chart showing both the cumulative savings 530 and cash shortfall 532 are displayed in the window 528. In another window 534 a clickable list of recurrent expenses 536 is displayed from which, the user may select spendings he is willing to reduce. This interactive process continues until either the shortfall is eliminated or the user has eliminated or reduced his luxury expenses to the level he is comfortable.

FIG. 17 illustrates another possible intervention to reduce or eliminate a projected cash short fall. The LifePath system begins by calculating the value in the first year of cash flow shortfall 538. The user's investment portfolio value and the breakdown between the various classes of assets are derived from the user's personal net worth data. For reducing projected cash shortfalls these assets must be in the outside of an IRA or a 401K plan. In one embodiment of the present invention the user's investment portfolio has 3 components: cash equivalents, equities and fixed income (bonds, etc.). Cash is assumed to grow at 3%, equities at 10% and fixed income assets at 6%.

The user may rebalance his portfolio by changing the mix between the various assets in his portfolio 540. The LifePath system recalculates the portfolio value from the start to the first year of the shortfall 542. If the value of the shortfall is smaller than the change in the value of the portfolio 544, the LifePath system may dispense coaching feedback 550 and moves to the next shortfall 552. If the value of the shortfall is greater than the change in the value of the portfolio 545, then the LifePath system prompt the user to try to rebalance his portfolio again 546. If the user selects to retry to rebalance his portfolio he will be taken to step 540. If he is done with rebalancing his portfolio, he moves on to the next intervention 548.

Figure 18:
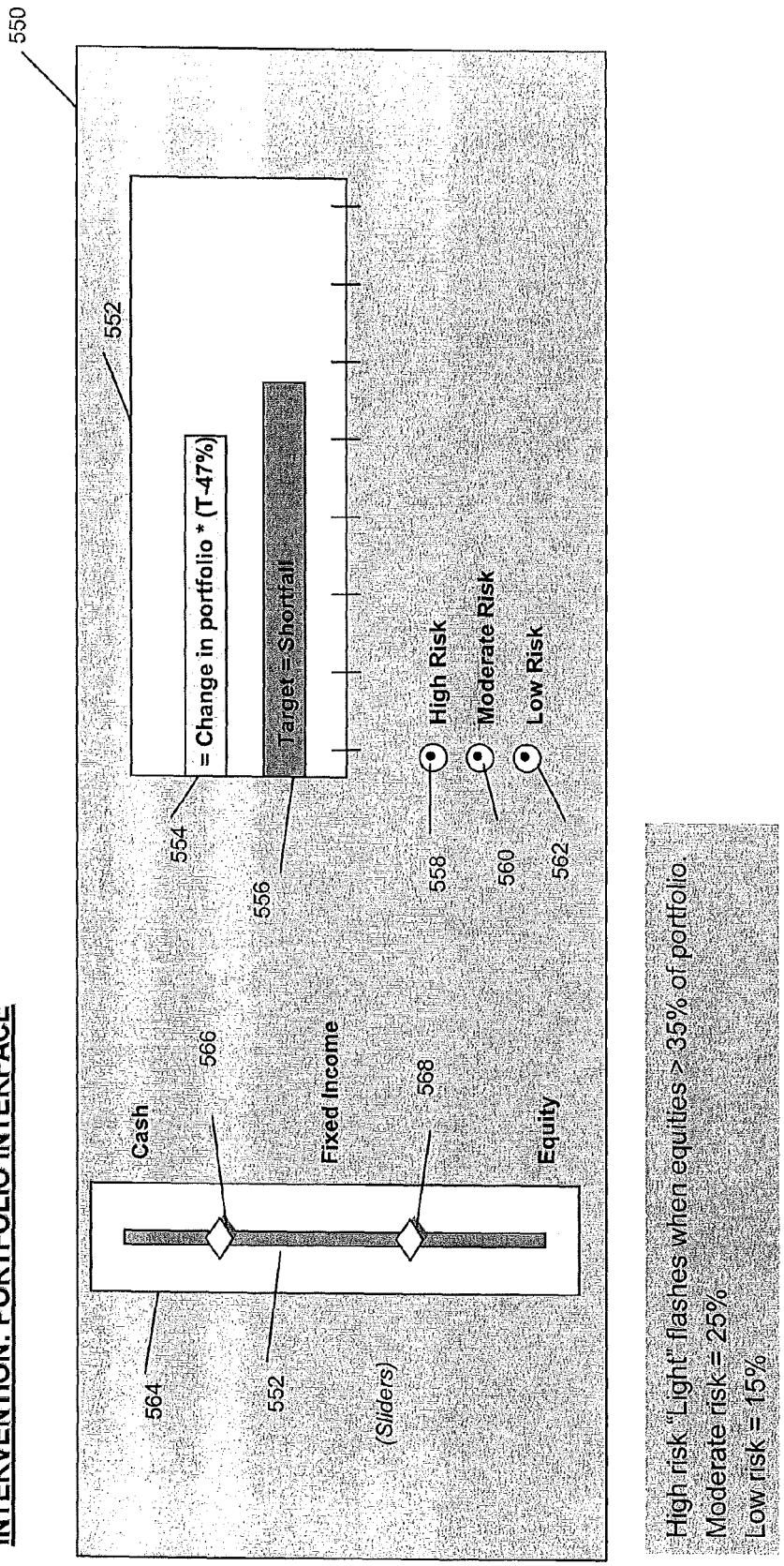
FIG. 18 illustrates a portfolio rebalancing interface.

FIG. 18 is an embodiment of a portfolio rebalancing interface 550. The change in a portfolio based on rebalancing 554 and its effect on the cash shortfall target to be overcome 556 are displayed in the form of a bar charts in the display window 552. Changes due to rebalancing of the portfolio are reflected in the bar graphs 554 and 556. Three icons for high risk 558, moderate risk 560, and low risk 562 flash are used as indicators for the amount of risk the user's portfolio is assuming. When the equities comprise more than 35% of the portfolio, the high risk icon flashes. Moderate risk is set at equities being less than 25% of the total value of the portfolio and low risk is set when equities are less than 15% of the total portfolio. A unique user interface 564 is used by to set the distribution of the assets in the user's portfolio. As the user moves the sliders 566 and 568, the resulting changes in the portfolio is reflected in the bar chart 554. By changing the asset mix in his portfolio, the user is assuming various degrees risk and he may increase or decrease the overall return on his investment portfolio and resolve the projected cash shortfall.

Figure 19:
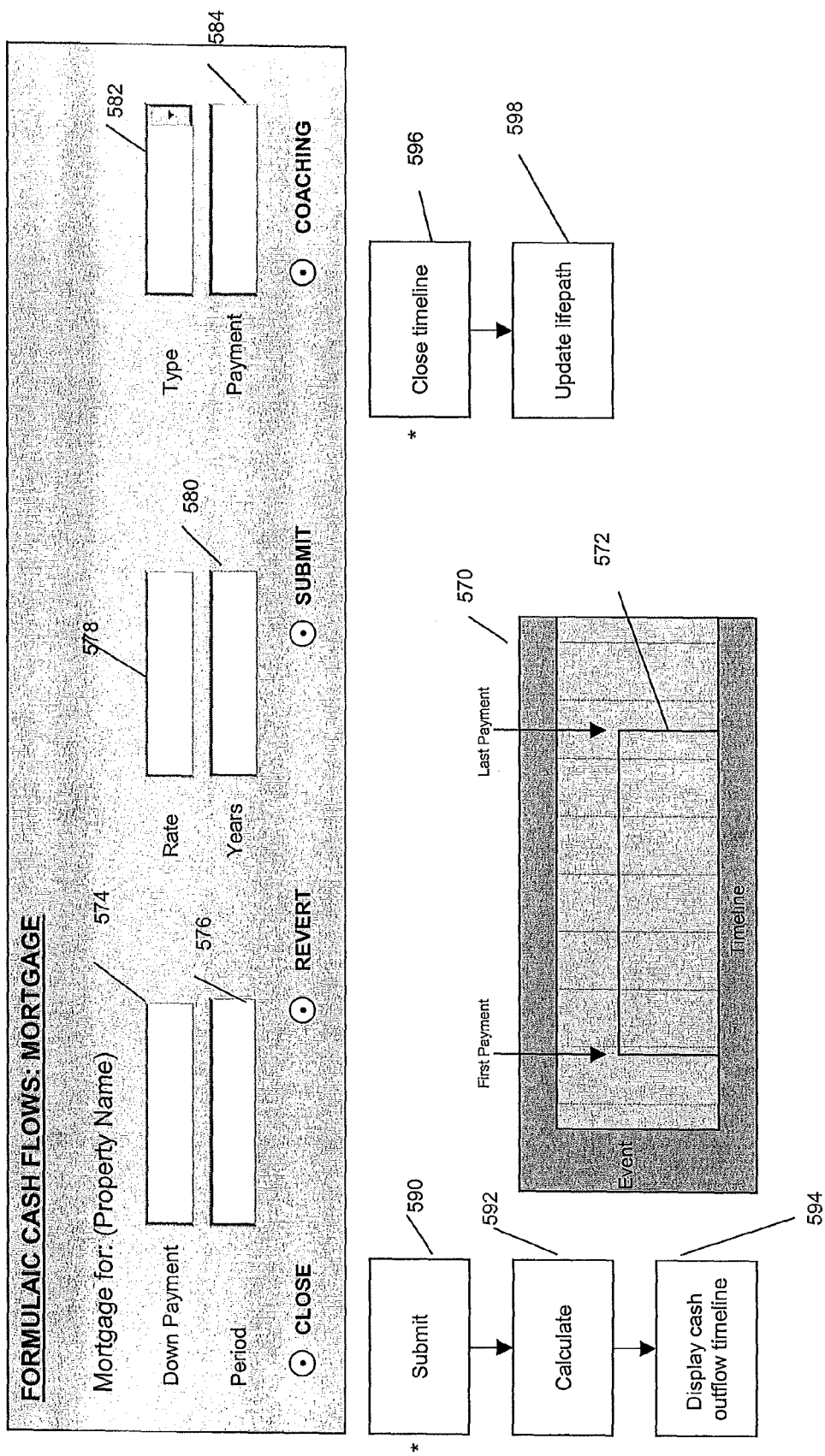
FIG. 19 illustrates a interface and a flow diagram for a formulaic cash flow input interface.

FIG. 19 outlines an example of an embodiment of the layout for calculating and analyzing a long-term financial commitment such as a mortgage 570. The same window may be used for any other type of formulaic cash flow such as loan repayments, leasing, annuity cash flow and others alike. An information entry window 572 may be used to input the details on the financial instrument. The user inputs the amount of the down payment 574, the loan period 576, the interest rate 578, the years into the loan 580, the type of loan 582 and the payment 584. The mortgage type may require more input for special features, balloon payments, etc. Once all the information is inputted, the user submits the data 590 and a calculator calculates a graph of the cash flow for the mortgage 592 and displays it to the user 594. The window 592 and the graph 594 are a possible window and a graph modeling the mortgage. Once the user is satisfied with the model, he may close the timeline 596 and the LifePath system updates the LifePath model with the information for the mortgage 598.

Figure 20:
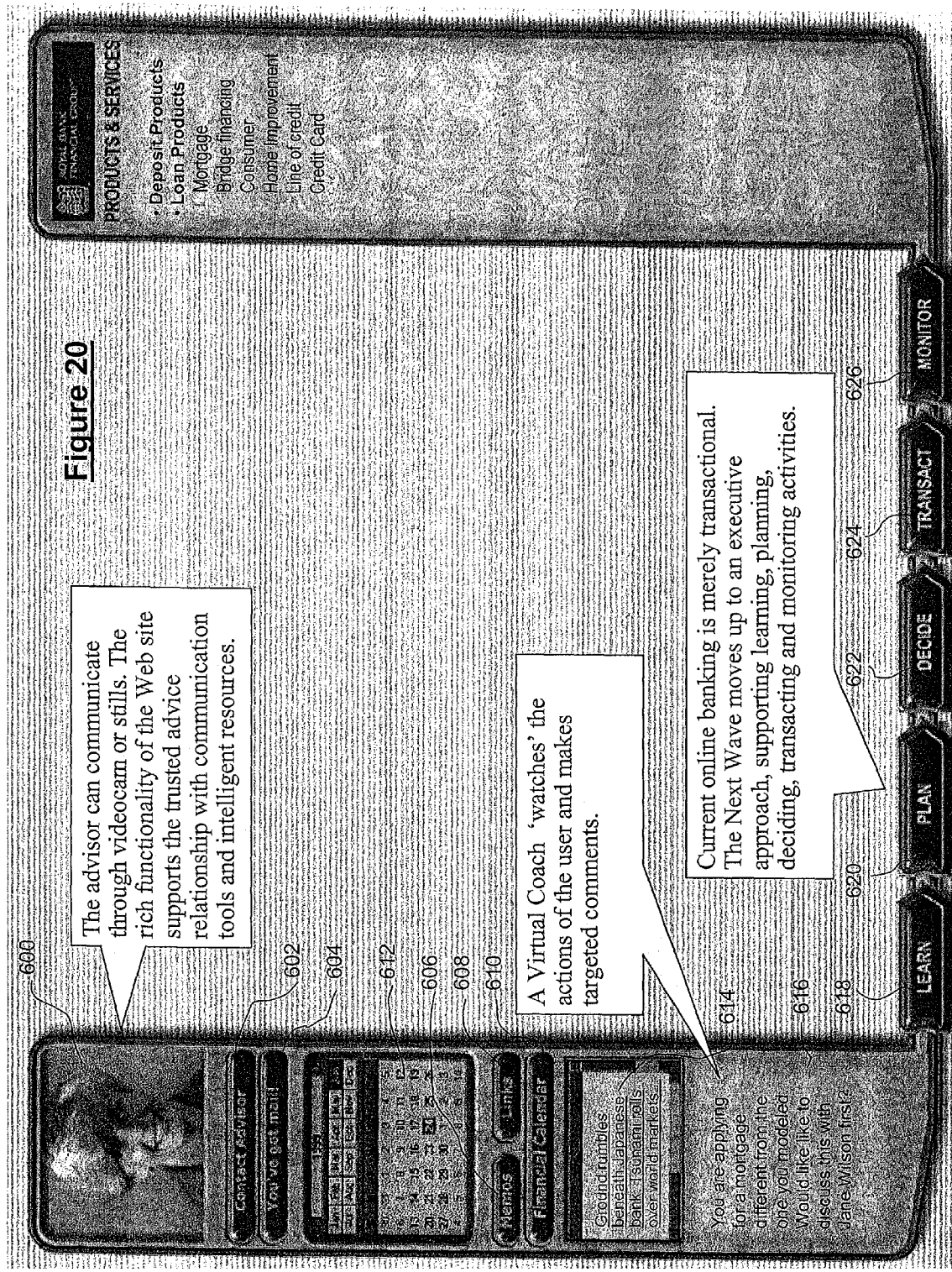
FIG. 20 is an illustration of a LifePath model web page interface.

FIG. 20 is an example of one embodiment of a web page interface for the present invention. The web page interface of FIG. 20 shows a customized web site and an intuitive graphical user interface for the LifePath model subsystem. As previously discussed, the web site may be a personalized web site which a client uses to access a customized virtual coach and/or a live financial advisor. As depicted, the graphical user interface can include an advisor area 600, where the advisor may be represented as a still image, via streaming video, or represented by a character. Selecting a link, such as the Contact Advisor link 602 shown, causes a connection to the advisor to be established. Preferably, the advisor and the user are able to communicate orally via network telephony of a type known in the art, but communication via email, chat, telephone call, or of any other type is acceptable.

The advisor uses the space to negotiate an initial Service Level Agreement (SLA), and begin the modeling of the customer's LifePath. This flushes out issues and permits an early estimate of customer value potential. The SLA nails down much advisor time the customer wants, how information will be shared, and how much intentions-based advice the customer will welcome. The advisor configures the Web site in accordance with this agreement. The investment of effort in this, along with the personal online relationship begins to develop customer loyalty. Much of the communication presented by the system is generated by rule-based business logic. This is what leverages the advisors, extending their reach. It should be noted that the client negotiates a Service Level Agreement at the start of the relationship for desired level of advisor support and how the bank may or may not use their personal information. Website functionality can provide new levels of customer support even if customer wants low level of advisor interaction.

A link 604 may be provided that allows access to email. Other links can include a link 606 to personal memoranda, a link 608 to a links page, and a link 610 to a financial calendar. As an option, a calendar 612 and links 614 to news stories may be displayed on the page.

A virtual coach area 616 of the page can be provided to display the comments and advice created by the virtual coach. As described above, client data drives a rules-based "coaching engine" that dynamically analyzes customer needs and automates most of advisor's work. The client is encouraged to consolidate all their financial information in the site, recognizing assets and liabilities with other financial institutions.

Upon selection of a button depicted along the bottom of the screen, a particular feature of the financial management system is displayed. For example, selecting the learn button 618 may bring up a portion of the screen (or a new screen) that discusses the functions and features of the financial management system. The plan button 620 may display the LifePath model in time series form. A decide button 622 may display a screen that allows the user to make financial decisions, such as allowing a user to select transactions recommended by the advisor and/or the virtual coach. A transact button 624 may display a transaction screen on which the user performs transactions. A monitor button 626 may display current and/or historical information about transactions made by the user and/or financial performance.

The LifePath interactive financial model captures customer's intentions at the start of the relationship and displays them as lifetime cash flow requirements. Customer data and LifePath information combine to form a deep understanding of the customer's financial needs at each stage of life. Using dynamic, interactive multimedia, it quickly captures the customer's intentions and expectations about an ideal future. This flushes out some issues which trigger the initial discussions in the relationship. It also supports estimating the lifetime value of the customer and the appropriate levels of service. The data from this model combines with insight from product and transaction history as well as real time input from the abundance of interactive models to power rule-based coaching engines. This automated advice leverages the advisor's time so that a broad customer based can be profitably supported. Configured using sliders and other interactive controls, there is little typing to slow the process down. The controls build a linear graphic representation of a LifePath which models predictable life transitions over time more effectively then data-driven calculators. Sales opportunities, lifetime customer value and appropriate fee structure are now more accurately identified.

Risk analysis may be integrated into the LifePath model enabling clients to better understand their financial health and to improve trade-off decisions. Formulating a personal risk/reward strategy is difficult. The LifePath model supports a risk simulator, showing how the ideal model would be impacted by typical life crises. The model can be played repeatedly with varying outcomes to foster an intuitive understanding of exposure and to provide grounded input into trade-off decisions. Using the risk modeling tools, the advisor can add value, consolidate the relationship and rationalize a stream of product sales.

Figure 21:
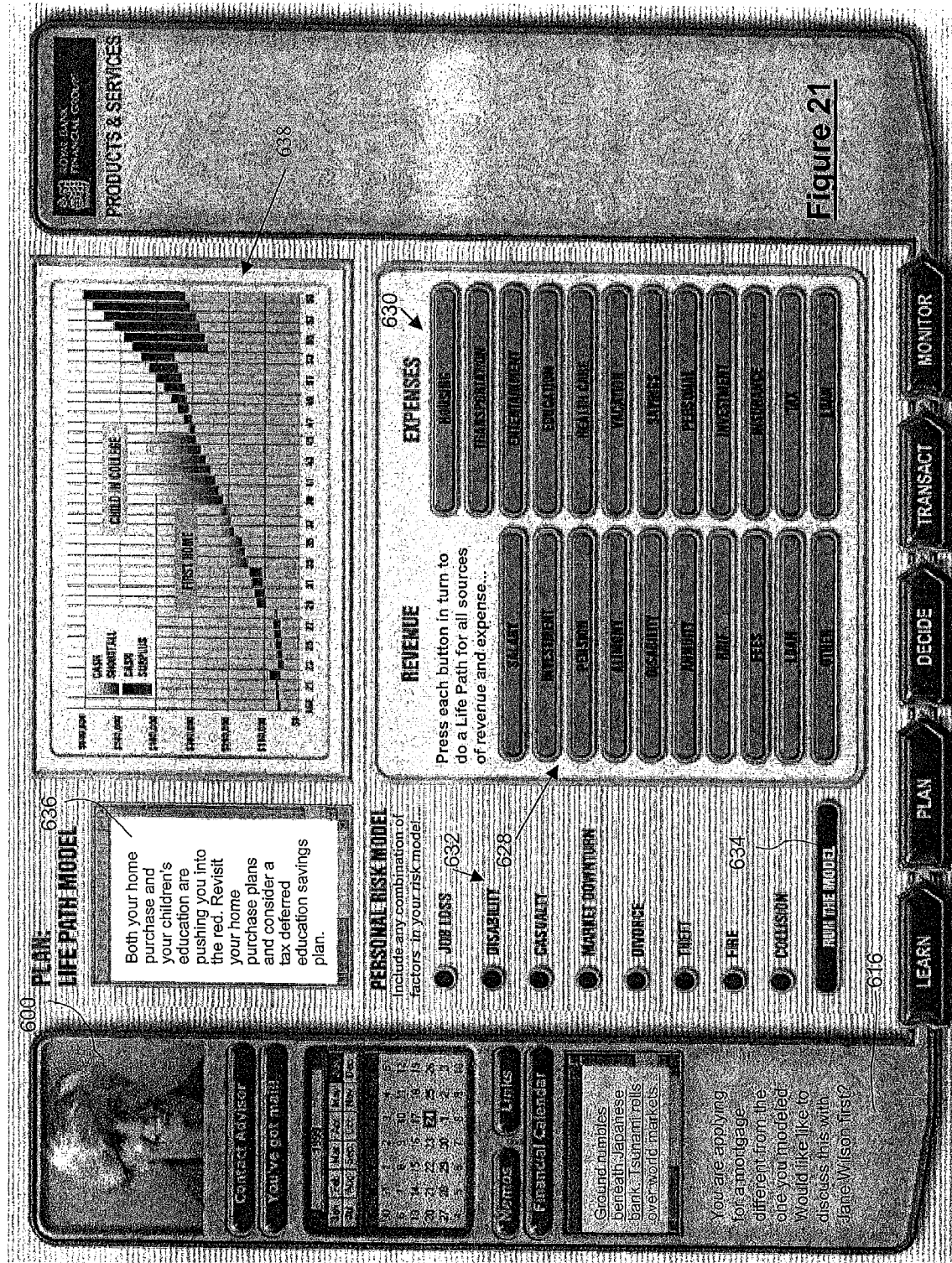
FIG. 21 is an illustration of a LifePath model web page's interactive computing environment.

As shown in FIG. 21, LifePath model 164 captures the user's life intentions expressed as revenue intentions 628 and expense intentions 630. As discussed above, revenue intentions 628 are a summary of the user's expense information 630. The user is provided with an individual button for each of the income information categories 628. For example, the user can input their income information such as salary, investment, pension, alimony, or disability, or other financial information as shown in FIG. 21. Similarly, the user can input their expense intentions which are shown by the category of interactive buttons 630. For example, the user can input expense information such as housing, transportation, education, health care, or other expense information as shown in FIG. 21.

Additionally, the user can control the level of risk that the model considers by selecting one or more of the graphical user interface ("GUI") elements from the list of risk events 632. The risk events 632 include various life events that may affect the user's LifePath model. For example, the user can request that the model include job loss, disability, casualty, market downturn, or other personal risk factors into their LifePath model.

After providing the model with his or her life intentions expressed as revenue intentions 628 or expense intentions 630 in addition to any of the risk events, the user can select button 634 to run the LifePath model and initiate the advice generating subsystem. Accordingly, the user is provided with detailed advice in window 636 that is tailored to the user's life intentions and the risk events specified. As shown in window 636, the user is provided with a clear automated coaching tailored to his or her life intentions gathered by the LifePath model. Furthermore, the coaching incorporates the risk events specified from the risk factors 632. The graphical display 638 in FIG. 21 is a time series representation of the aggregated total of the user's cash flow over a selected period of time, based on the user provided revenue intentions 628 and expense intentions 630.

Additionally, the system provides the user with interactive and context sensitive virtual coaching 616 and 636 that notes the actions of the user while he progresses through the LifePath model and provides the user with suggestions to ensure that he continues to comply with his or her life intentions.

The various embodiments described above are provided by way of illustration only and should not be constructed to limit the invention. Those skilled in the art will readily recognize the various modifications and changes which may be made to the present invention without strictly following the exemplary embodiments illustrated and described herein, and without departing from the true spirit and scope of the present invention, which is set forth in the following claims.

What is claimed is:

1. A method for developing a long-term financial plan using a financial modeling and counseling system accessible over a wide area network comprising:
   projecting expected yearly income for a period of time based on user-provided historical financial information and external market data, said historical financial information relating to user income and expenses, and said external market data including at least one of interest rates and inflation rates;
   projecting expected yearly expenses for said period of time based on the user-provided historical financial information and the external market data;
   providing investment coaching over the wide area network for any projected surplus of income after expenses, said investment coaching including investment advice, tax advice, product recommendations, and additional information for recommended products;
   providing financial coaching over the wide area network for any projected deficit of income after expenses, said financial coaching including tax advice, business funding advice, spending advice, and investment portfolio balancing advice;
   wherein the investment coaching and financial coaching are each directly provided to a user through a customized automated coaching interface, and are each directly provided to the user through customized independent counseling from a live advisor; and
   wherein access to the customized automated coaching interface and independent live advisor counseling is provided over the wide area network according to a user-selected service level agreement selected from a plurality of available unique service level agreements, wherein each of the available unique service level agreements includes a unique combination of amounts of accessible customized automated coaching, customized live advisor counseling, and the external market data, and
   wherein the user introduces life risk events into the at least one of the income and expense projections and wherein the automated coaching interface performs a life risk analysis, the life risk analysis comprising calculating an impact of the life risk events on a cash flow of the user based on the life risk events, actuarial data, the expected yearly income, and the expected yearly expenses.

2. The method of the claim 1 wherein user income and expense history reside on external databases.

3. The method of claim 2 wherein the life risk event includes at least one of: job loss, disability, casualty, divorce, theft, fire, and collision.

4. The method of claim 1 wherein the at least one of the income and expense projections predicts and highlights potential cash flow surplus and cash flow shortage for the user.

5. The method of claim 1 wherein the at least one of the income and expense projections includes displaying the aggregate cash flow in the form of a timeline over a defined period of time.

6. The method of claim 5 wherein each annual point of said timeline can be interactively dragged up and down on its vertical axis.

7. The method of claim 6 wherein the at least one of the income and expense projections includes recalculating the aggregated cash flow based on the new positions of said annual points.

8. A system for developing a long term financial plan comprising:
- a user computer system coupled to a wide area network;
- a financial model generator coupled to said wide area network configured to project yearly user income and user expenses based on user-provided historical financial information and external market data for a plurality of years, said historical financial information relating to user income and expenses, and said external market data including at least one of interest rates and inflation rates;
- a financial counseling server coupled to said wide area network configured to dispense investment coaching for any projected surplus of income after expenses, said investment coaching including investment advice, tax advice, product recommendations, and additional information for recommended products, and configured to dispense financial coaching related to a projected user cash flow over said plurality of years, said financial coaching including tax advice, business funding advice, spending advice, and investment portfolio balancing advice;
- wherein the investment coaching and financial coaching are each directly provided to a user through a customized automated coaching interface, and are each directly provided to the user through customized independent counseling from a live advisor; and
- wherein access to the customized automated coaching and independent live advisor counseling is provided over the wide area network according to a user-selected service level agreement selected from a plurality of available unique service level agreements, wherein each of the available unique service level agreements includes a unique combination of amounts of accessible customized automated coaching, customized live advisor counseling, and the external market data, and
- wherein the user introduces life risk events into the at least one of the income and expense projections and wherein the automated coaching interface performs a life risk analysis, the life risk analysis comprising calculating an impact of the life risk events on a cash flow of the user based on the life risk events, actuarial data, the yearly income, and the user expenses.

9. The system of claim 8 wherein user income and expense history residing on external databases can be accessed by the financial model generator through the wide area network.

10. The system of claim 9 wherein the risk event includes at least one of: job loss, disability, casualty, market downturn, divorce, theft, fire, and collision.

11. The system of claim 8 wherein the financial model generator predicts and highlights potential cash flow surplus and cash flow shortage.

12. The financial model generator of claim 8 wherein the at least one of the income and expense projections includes displaying the aggregate cash flow in the form of a timeline over a defined period of time.

13. The system of claim 8 wherein each annual point of said timeline can be interactively dragged up and down on its vertical axis.

14. A computer program embodied on a computer readable medium for developing a long term financial plan using a financial modeling and counseling system, accessible over a wide area network, which, when executed on a computer, performs the method comprising:
- projecting expected yearly income for a period of time based on user-provided historical financial information and external market data, said historical financial information relating to user income and expenses, and said external market data including at least one of interest rates and inflation rates;
- projecting expected yearly expenses for said period of time based on the user-provided historical financial information and the external market data;
- providing investment coaching over the wide area network for any projected surplus of income after expenses, said investment coaching including investment advice, tax advice, product recommendations, and additional information for recommended products;
- providing financial coaching over the wide area network for any projected deficit of income after expenses, said financial coaching including tax advice, business funding advice, spending advice, and investment portfolio balancing advice;
- introducing life risk events into the model; and
- performing a life risk analysis through a customized automated coaching interface, the life risk analysis comprising calculating an impact of the life risk events on a cash flow of the user based on the life risk events, actuarial data, the expected yearly income, and the expected yearly expenses,
- wherein the investment coaching and financial coaching are each directly provided to a user through the customized automated coaching interface, and are each directly provided to the user through customized independent counseling from a live advisor; and
- wherein access to the customized automated coaching and independent live advisor counseling is provided over the wide area network according to a user-selected service level agreement selected from a plurality of available unique service level agreements, wherein each of the available unique service level agreements includes a unique combination of amounts of accessible customized automated coaching, customized live advisor counseling, and the external market data.

15. The computer program embodied on the computer readable medium of claim 14, the method further comprising accessing user income and expense history residing on external databases.

16. The computer program embodied on the computer readable medium of claim 15, wherein the risk event includes at least one of: job loss, disability, casualty, market downturn, divorce, theft, fire, and collision.

17. The computer program embodied on the computer readable medium of claim 14, the method further comprising predicting and highlighting potential cash flow surplus and cash flow shortage for the user.

18. The computer program embodied on a the computer readable medium of claim 14, the method further comprising displaying the aggregated cash flow in the form of a timeline over a defined period of time.

19. The computer program embodied on the computer readable medium of claim 18, the method further comprising dragging up and down each annual point of said timeline interactively on its axis.

20. The computer program embodied on the computer readable medium of claim 19, the method further comprising recalculating the aggregated cash flow based on the new positions of said annual points.

21. The method of claim 4, wherein the life risk event includes at least one of market downturn and portfolio downturn.

* * * * *

UNITED STATES PATENT AND TRADEMARK OFFICE
CERTIFICATE OF CORRECTION

| | | |
|---|---|---|
| PATENT NO. | : 7,921,048 B2 | Page 1 of 1 |
| APPLICATION NO. | : 09/929610 | |
| DATED | : April 5, 2011 | |
| INVENTOR(S) | : Ronald E. Sloan et al. | |

It is certified that error appears in the above-identified patent and that said Letters Patent is hereby corrected as shown below:

Claim 21, col. 20, line 62, "The method of claim 4" should read --The method of claim 3--.

Signed and Sealed this
Twenty-first Day of June, 2011

David J. Kappos
*Director of the United States Patent and Trademark Office*